US005537601A

United States Patent [19]
Kimura et al.

[11] Patent Number: 5,537,601
[45] Date of Patent: Jul. 16, 1996

[54] PROGRAMMABLE DIGITAL SIGNAL PROCESSOR FOR PERFORMING A PLURALITY OF SIGNAL PROCESSINGS

[75] Inventors: Junichi Kimura; Yoshito Nejime, both of Hachiouji; Kouji Noguchi, Kokubunji, all of Japan

[73] Assignee: Hitachi, Ltd., Tokyo, Japan

[21] Appl. No.: 272,749

[22] Filed: Jul. 11, 1994

[30]   Foreign Application Priority Data

Jul. 21, 1993  [JP]  Japan .................................. 5-179594

[51] Int. Cl.$^6$ .................................................... G06F 15/20
[52] U.S. Cl. .......................... 395/800; 395/500; 395/162; 395/2; 358/443
[58] Field of Search ................................ 395/800, 162, 395/500, 2; 358/443

[56]   References Cited

U.S. PATENT DOCUMENTS

| | | | |
|---|---|---|---|
| 5,046,023 | 9/1991 | Katsura et al. | 364/518 |
| 5,195,130 | 3/1993 | Weiss et al. | 379/98 |
| 5,329,471 | 7/1994 | Swoboda et al. | 364/578 |
| 5,361,373 | 11/1994 | Gilson | 395/800 |
| 5,367,629 | 11/1994 | Chu et al. | 395/162 |

FOREIGN PATENT DOCUMENTS 0497029  8/1992  European Pat. Off. ........ G06F 15/75

OTHER PUBLICATIONS

McAndrew, "Design for High–Performance DSP", New Electronics, Mar. 17, 1987, pp. 21–22.
Leonard, "Silicon . . . videoconferencing", Electronic Design, v40, n7, pp. 45–46, Apr. 2, 1992 (text only).
Richardson, "Videoconferencing . . . video and audio quality", Data Communications, Jun., 1992 v21, n9, p. 103 (text only).
Alfredo R. Linz, "A Low–Power PLA for a Signal Processor", 1991, pp. 107–115.
M. E. Baka et al., "An Optimised FPGA Configuration for Signal Processing", 1992, pp. 107–110.
Richard B. Lazarus et al., "Realization of a Dynamically Reconfigurable Preprocessor", 1993, pp. 74–80.
Proceedings of the IEEE 1990 Custom Integrated Circuits Conference, May 1990, pp. 31.4.1–31.4.4, N. Hastle and R. Cliff, "The Implementation of Hardware Subroutines on Field Programmable Gate Arrays".
Proceedings of IEEE Workshop on FPGAS For Custom Computing Machines, Apr. 1993, pp. 17–24, C. Iseli and E. Sanchez, "Spyder: A Reconfigurable VLIW Processor Using FPGAs".
Proceedings of the International Conference on Industrial Electronics, Control and Intrumentation, Nov. 1991, pp. 2014–2018, L. Nozal et al, "A New Vision System: Programmable Logic Devices and Digital Signal Processor Architecture (PLD+DSP)".
Computers In Education Journal, vol. 2, No. 3, Jul. 1992, pp. 11–16, G. Aranguren–Aramendia et al, "Hardware/Software/Firmware: A Comparative Study in Artificial Vision Application".
IEE Colloqium On Applications Specific Integrated Circuits For Digital Signal Processing, Jun. 1993, pp. 3–1 –3–6, M. Wahab and D. Puckey, "Reconfigurable DSP Systems".
Computer Design, vol. 32, No. 7, Jul. 1993, pp. 71–72–76, XP353951, D. Bailey "The Virtues of Programmability".
1992 IEEE International Solid–State Circuits Digest of Technical Papers, "A Video Digital Signal Processor with a Vector–Pipeline Architecture", Toyokura et al, pp. 72–73.

Primary Examiner—Alyssa H. Bowler
Assistant Examiner—John Follansbee
Attorney, Agent, or Firm—Fay, Sharpe, Beall, Fagan, Minnich & McKee

[57]   ABSTRACT

A digital signal processor for processing various types of signals, such as an image signal and an audio signal, a basic signal processing part, a programmable logic part, and a bus for connecting these parts together. Circuit configuration data is transferred to the programmable logic part from an external memory through a data input/output line and the bus under control of the basic signal processing part. The circuit configuration data corresponds to the types of signal processing that is to be performed, and several different types of signal processings can be performed successively.

48 Claims, 26 Drawing Sheets

PROGRAMMABLE DIGITAL SIGNAL PROCESSOR FOR PERFORMING A PLURALITY OF SIGNAL PROCESSINGS

FIELD OF THE INVENTION

The present invention relates to a digital signal processor, and particularly to a digital signal processor for executing digital signal processing such as analyzing, coding, and synthesizing various types of video and audio signals in a multimedia terminal.

BACKGROUND OF THE INVENTION

Since a digital signal processor (DSP) has a multiplier accumulator, filter processing, frequency conversion, and matrix operation can be easily performed by software. To process image signals, however, there are too many picture elements to be processed. For example, in the case of digital TV signal processing, it is necessary to process signals at a rate of 20M picture elements per second. Therefore, because the required high-speed processing rate cannot be achieved only by the software processing using the DSP, it is necessary to use an exclusive circuit in addition to the DSP. To reduce the circuit scale, as described in "A Video Digital Signal Processor with a Vector-Pipeline Architecture, 1992 IEEE International Solid-State Circuits Conference DIGEST OF TECHNICAL PAPERS, pp. 72–73 (1992.2) by TOYOKURA, et. al." exclusive circuits are built in the DSP. The configuration of the DSP disclosed in the above document will be briefly described below referring to FIG. 1.

SUMMARY OF THE INVENTION

FIG. 1 shows a conventional video digital signal processor (VDSP) for video CODEC systems that includes exclusive circuits. The VDSP 1 includes a basic signal processing part (core part) 14 having an arithmetic and logic unit (ALU), registers (REG), an accumulator (ACC) and other exclusive circuits, such as a DCT, spatial filter, etc.

In the case of image processing, particularly of image compression, processing of "8 picture elements×8 lines" in units of a block is basically performed. Main operations of blocks include the computation of the difference between picture elements in each block, discrete cosine transform (DCT) performed by using equations 1 and 2, and filter processing by equation 3.

$$F(u,v) = \frac{1}{4} C(u)C(v) \sum_{x=0}^{7} \sum_{y=0}^{7} f(x,y) \cos\left\{ \frac{(2x+1)u \times \pi}{16} \right\} \cos\left\{ \frac{(2y+1)v \times \pi}{16} \right\} \quad (1)$$

$$C(u), C(v) = \begin{bmatrix} \frac{1}{\sqrt{2}} \ldots \text{for } u, v = 0 \\ 1 \ldots \text{otherwise} \end{bmatrix} \quad (2)$$

$$\hat{f}(x,y) = \frac{1}{16} \{f(x-1,y-1) + 2 \times f(x,y-1) + f(x+1,y-1) + 2 \times f(x-1,y) + 4 \times f(x,y) + 2 \times f(x+1,y) + f(x-1,y+1) + 2 \times f(x,y+1) + f(x+1,t+1)\} \quad (3)$$

To efficiently perform these processings, the VDSP 1 has 8×8 (64 words) memories 6, 7, and 8, a DCT circuit 15, and a filter circuit 16 which can arbitrarily be changed by a switch circuit 13. For example, in the case of processing a block read from two external memories, respectively, and applying DCT to a differential signal, the VDSP 1 performs the following operations:

1. Outputs the address of each block from addresses 21 and 22;
2. Selects image data using signal lines 2 and 3 corresponding to the respective addresses by selecting circuits 4 and 5 and stores them in the internal memories 6 and 7 in order;
3. Reads signals from the internal memories 6 and 7 as picture elements one by one at the same time and computes a difference with the core part 14;
4. Stores computation results in the third internal memory 8 through a bus 18;
5. Reads data from the internal memory 18 after ending the subtraction and inputs the data to the DCT circuit 15; and
6. Stores the output of the DCT circuit in the internal memory 6 through the bus 18 and selecting circuit 4.

By performing the above processings, it is possible to execute the compression of an image. Moreover, the VDSP 1 has an output line 19, input line 20, and input/output control circuit 17 in order to transfer signals to and from the outside. Signal lines 21 and 22 output the control signals for addressing external units when data is read from the outside.

FIG. 2 shows an example of the core part 14 shown in FIG. 1. Core part 14 is divided into an operation part mainly comprising an ALU 206, an accumulator 207, registers 201, an internal RAM 208, and an internal ROM 209. Setting and control of the input/output of data is performed in accordance with a program stored in the ROM 209 or an external ROM, not shown. In FIG. 2, an external bus and an analyzing part of the program are not illustrated.

The operation part is so constituted that a multiplication-accumulation operation can easily be executed. A signal of a bus 200 or a signal 210 from an external bus such as a program bus is inputted to an integrating circuit 204 from selecting circuits 202 and 203. The integration result or the signal of the bus 200 is selected by a selecting circuit 205 and inputted to an ALU 206. The ALU 206 executes addition, subtraction or logical operation according to the content of a program, and the result is stored in the accumulator 207. It is possible to transfer the data in the accumulator 207 to the RAM 208 or registers 201 according to the content.

The signal processing is required to be executed at high speed so the image processing is performed by incorporating an exclusive circuit into a processor. However, when a higher-speed signal processing is required, many exclusive circuits must be used. Moreover, to perform various types of image processings, the entire circuit scale increases because it is necessary to provide an exclusive circuit corresponding to each type of signal processing.

It is an object of the present invention to provide a digital signal processor for use in a data processing system, such as a multimedia terminal, video/audio conferencing terminal system or computer for signal processing data including image data, audio data and other data requiring processing with specific functions. It is a further object to provide the digital signal processor with a small circuit scale.

To achieve the above objects, a digital signal processor for video and audio digital signal processing of the present invention comprises a basic signal processing part having a programmable logic part with a circuit configuration that can be determined or selectively configured from the outside, an accumulator, an arithmetic and logic unit, and registers. It is also provided with control means for fetching circuit configuration data from an external memory and for transferring the data to the programmable logic part. Also, a bus is provided for connecting the programmable logic part to the basic signal processing part. An input signal is processed by various types of processings and the processed signal is output. The basic signal processing part reads various types of circuit configuration data for configuring the programmable logic part corresponding to various types of processings, sequentially, whenever the programmable logic part starts each processing, and transfers the configuration data to the programmable logic part.

It is possible to execute various types of high-speed signal processing without losing the versatility of the digital signal processor capability and moreover without increasing the circuit size by using the above control means.

DETAILED DESCRIPTION OF THE PREFERRED EMBODIMENTS

Figure 1:
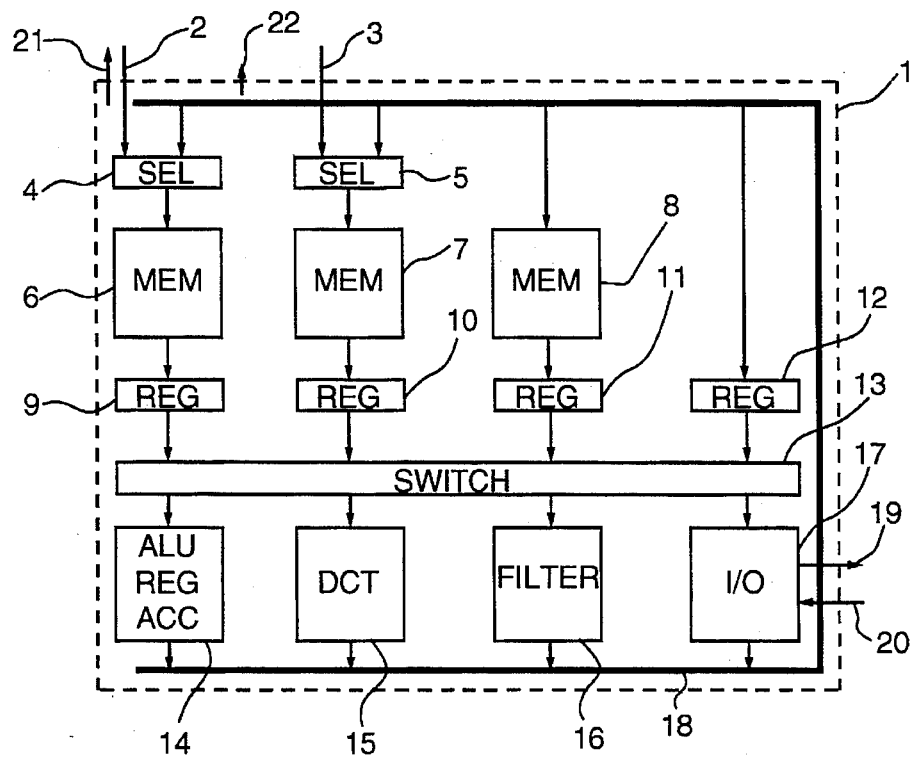
FIG. 1 shows an illustration of a conventional digital signal processor.
Figure 3:
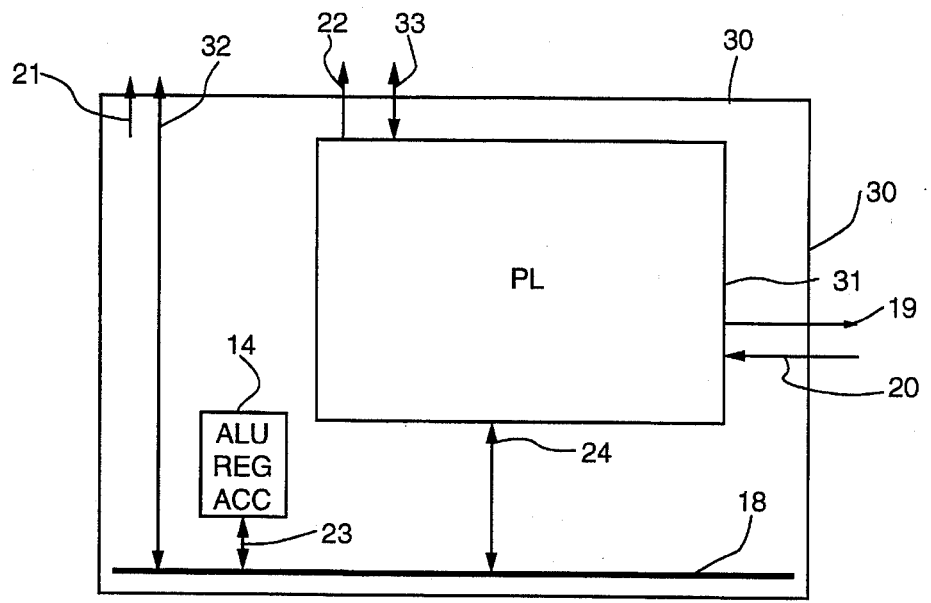
FIG. 3 shows an embodiment of the digital signal processor using the present invention.

The present invention is described below by reference to the embodiment shown in FIG. 3. The embodiment of FIG. 3 provides the same signal processing functions as those performed by the VDSP 1 of FIG. 1. The DSP 30 is connected to a host signal processing system such as a multi media terminal, computer, video conferencing system or similar machine, which requires various types of signal processing. In FIG. 3, a programmable logic part (PL part) 31 is provided that is not part of the VDSP of FIG. 1. In this embodiment, core part 14 controls the set up and configuration of PL part 31 in response to commands received from a host system, not shown. Circuit configuration data is transferred, for example, from the data input/output line 32, which is connected to an external storage device, to the PL part 31 through the bus 18. Exchange control of the data between the core part 14 and the PL part is performed through the bus 18. The PL part has a control line 22, a data line 33, and input and output lines 20, 19 for communication with an external unit. The bus 18 comprises a signal line for transmitting various types of data by means of time-sharing and a signal line dedicated to data, for example.

Figure 4:
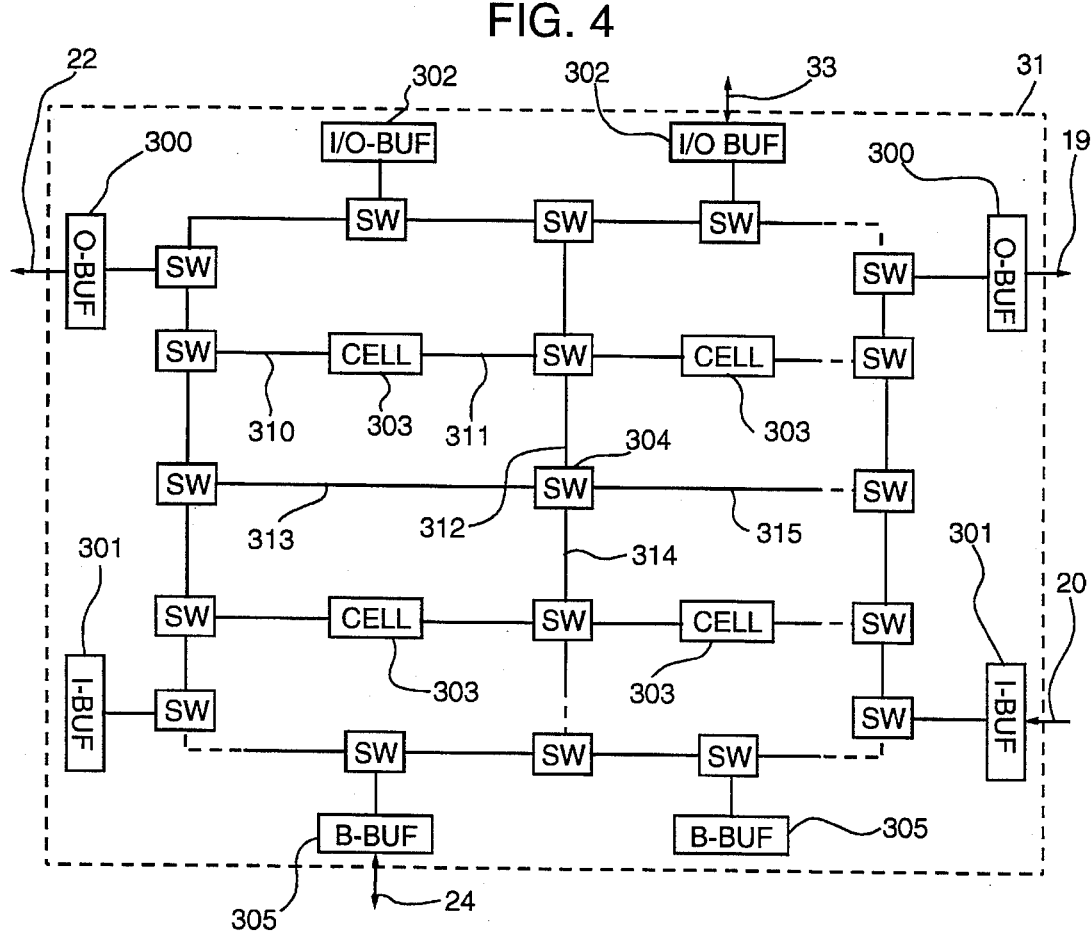
FIG. 4 shows a detailed diagram of the programmable logic part of the embodiment of FIG. 3.

The PL part 31, which is an embodiment of the present invention, will be described below referring to FIG. 4. The PL part can execute various types of signal processings by receiving circuit configuration data from the outside through, e.g., the bus 18 through connection 24. The PL part comprises arithmetic cells 303, inter-cell wires 304 and 310 to 315, and external input/output circuits 300 to 302. The arithmetic cells mainly perform signal processing, which includes receiving signals through input signal lines 310 and outputting the processing result to output signal lines 311. These input/output signal lines are connected to buses (e.g. 312) arranged between cells. By connecting these buses by bus switches 304, it is possible to freely set the input/output state of each arithmetic cell. Though the number of bits of the buses can be set arbitrarily, the following description is made with respect to a preferred embodiment wherein the number is 4 bits. As external input/output circuits, an output-dedicated circuit 300, an input-dedicated circuit 301, and an input-output common circuit 302 are prepared, which are connected to the above buses similarly to arithmetic cells and moreover which can be freely connected. In FIG. 4, only part of the arithmetic cells and external input/output circuits are shown because of drawing limitations. Thus, it is necessary to increase the number of arithmetic cells and the number of external input/output circuits beyond that shown according to the quantity of data to be processed.

Figure 5:
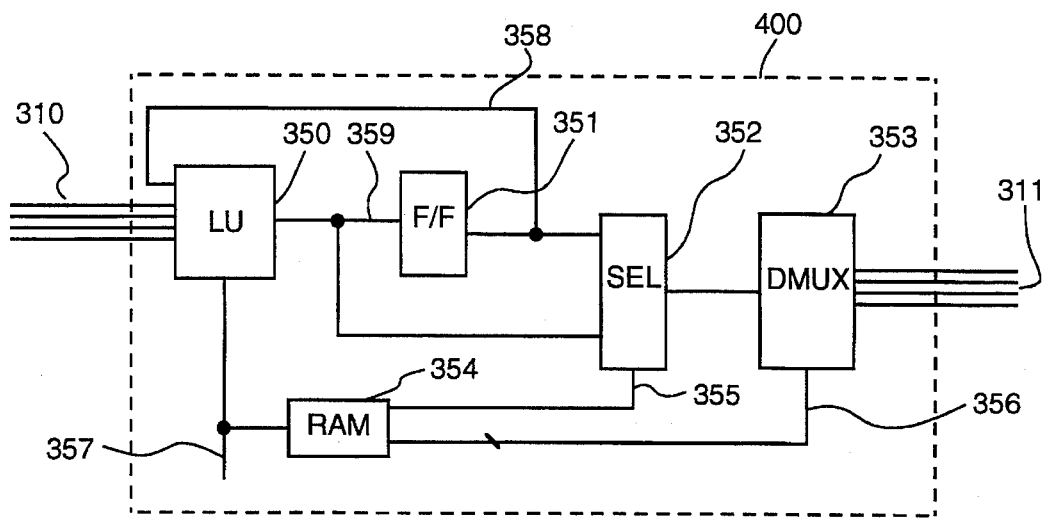
FIG. 5 shows a detailed diagram of the arithmetic cell part of FIG. 4.

FIG. 5 shows an embodiment of an arithmetic cell. An input signal 310 is inputted to an arithmetic and logic circuit 350 together with a feedback signal 358. The arithmetic and logic circuit outputs a value 359 corresponding to the inputted signal. An output value 359 of the arithmetic and logic circuit or a value obtained by delaying the output 359 by one clock with a flip flop 351 is selected by a selection circuit 352 in accordance with a selection signal 355. The selected signal is outputted as a selection part of the output signal 311 in accordance with a selection signal 356 by a demultiplexer 353. The unselected signal is disconnected from the output bus. The output 358 of the flip flop 351 is inputted to the arithmetic and logic circuit 350 as a feedback signal. Operation-content selection data for the arithmetic and logic circuit 350, selection data for the selection circuit 352, and selection data 356 for the demultiplexer 353 are inputted from the outside of the PL part 31 and held before operation is started. For example, the arithmetic and logic circuit 350 is realized by constituting it with a RAM and holding the selection data values 355 and 356 in a RAM 354.

In this embodiment, the input signal 310 and output signal 311 are of four bits respectively and the arithmetic and logic output value 359 and feedback signal 358 are of one bit, respectively. However, they can be of any number of bits.

Figure 6:
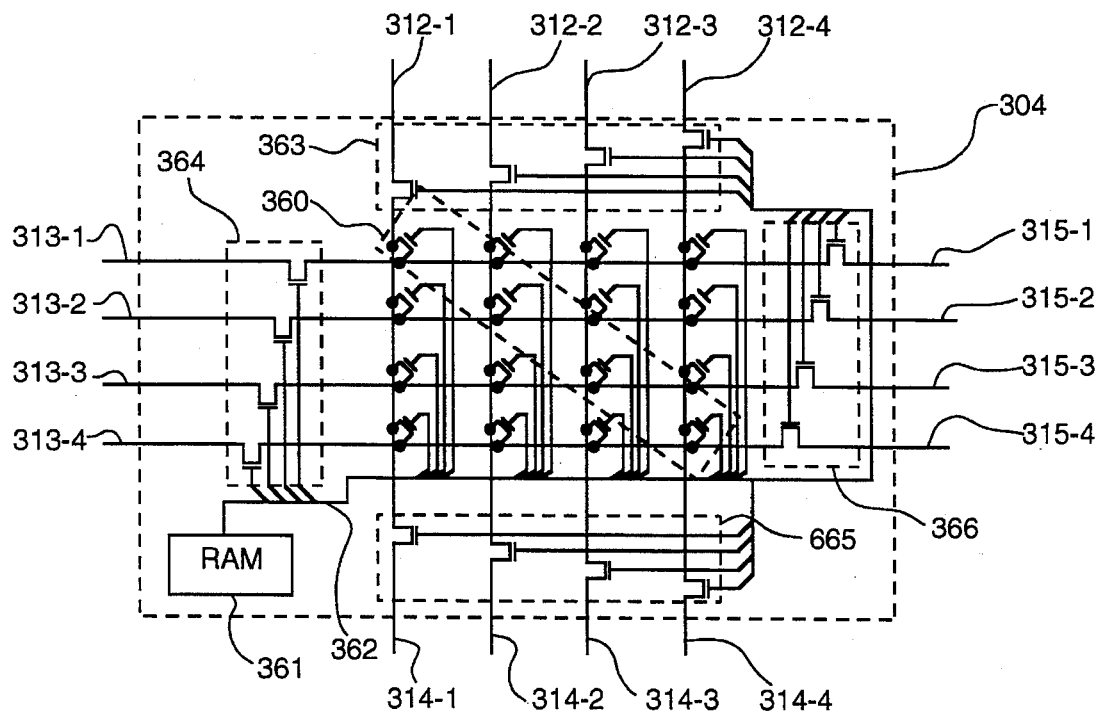
FIG. 6 shows a detailed diagram of the bus switch FIG. 4.

FIG. 6 shows an exemplary configuration of a bus switch 304 in FIG. 4 that can also be used for the bus switches of the other embodiments. For the bus switch in FIG. 6, it is possible to freely set the connection of signal lines 312, 313, 314, and 315 in accordance with the state of the internal switches (360, 363, 364, 365, and 366). For example, the bus 312 can be connected with other buses by setting the following switch state.

| State of switch | | | | | Signal line to which |
|---|---|---|---|---|---|
| 360 | 363 | 364 | 365 | 366 | signal 312 is connected |
| OFF | OFF | OFF | OFF | OFF | 312 Independent |
| ON | ON | ON | OFF | OFF | 312 = 313 |
| OFF | ON | OFF | ON | OFF | 312 = 314 |
| ON | ON | OFF | OFF | ON | 312 = 315 |

Any of the above combinations is possible. Switch connection control is performed through a control line connected to each switch. Each connection datum corresponds to the one-bit memory in the RAM 361 and it is possible to independently control the connection of each switch by changing the data in the RAM 361. The switch connection data in the RAM 361 is set before a bus is used. In FIG. 6, the RAMs are concentrated all in one place. However, it is also possible to distribute them one bit by one in the vicinity of each switch.

Figure 7:
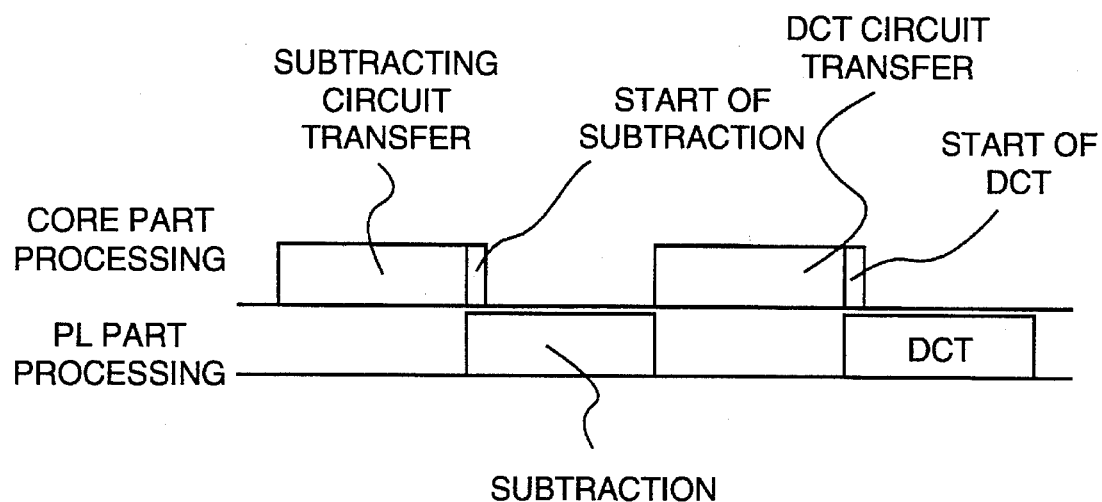
FIG. 7 is a timing chart showing the operations of the embodiments of FIGS. 3 to 6.

FIG. 7 is a timing chart of the operation of this embodiment. In FIG. 7, the timing chart of the processing in FIG. 1 previously described is shown. First, the core part 14 brings the PL part 31 into a circuit-data writable state. Then, it reads the circuit configuration data of a circuit for computing the differences for each picture element from, for example, an external ROM and transfers the data to a memory (e.g. RAM 354, 361) for storing each circuit configuration data value of the programmable logic part through the bus 18. When the data transfer ends, the core part 14 brings the PL part 31 into an operable state and starts processing through the bus 18. The core part is notified of the end of the processing of the PL part through the bus 18. After the end is confirmed, transfer of DCT circuit configuration data is started in accordance with the same procedure.

Figure 8:
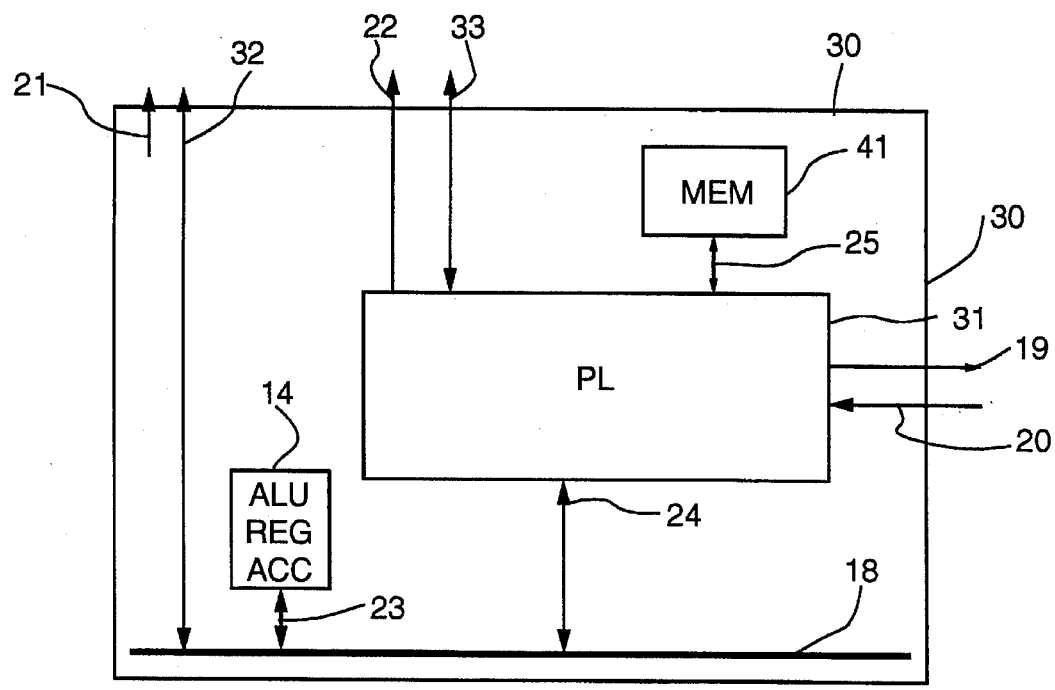
FIG. 8 shows a second embodiment of FIG. 2 using the present invention.

FIG. 8 shows a second embodiment of the present invention. The second embodiment is different from the embodiment in FIG. 3 in that a local memory 41 is connected to the PL part for interim processed data storage. Though the arithmetic and logic cell shown in FIG. 5 can be used as a one-bit memory, the circuit arrangement efficiency is low. By providing memories inside or outside the PL part, it is possible to ensure many memories in a given area for interim processing storage, thus improving overall processing efficiency. The memories can be RAMs, ROMs, simultaneous writable RAMs, and FIFO memories. In FIG. 8, only one memory is shown connected through a signal line 25 to the PL part 31. However, it is also possible to connect a plurality of memories. As for the connection type in this case, it is possible to connect a data line of a memory to one signal line using a bus or independently connect the signal line to each memory.

Figure 9:
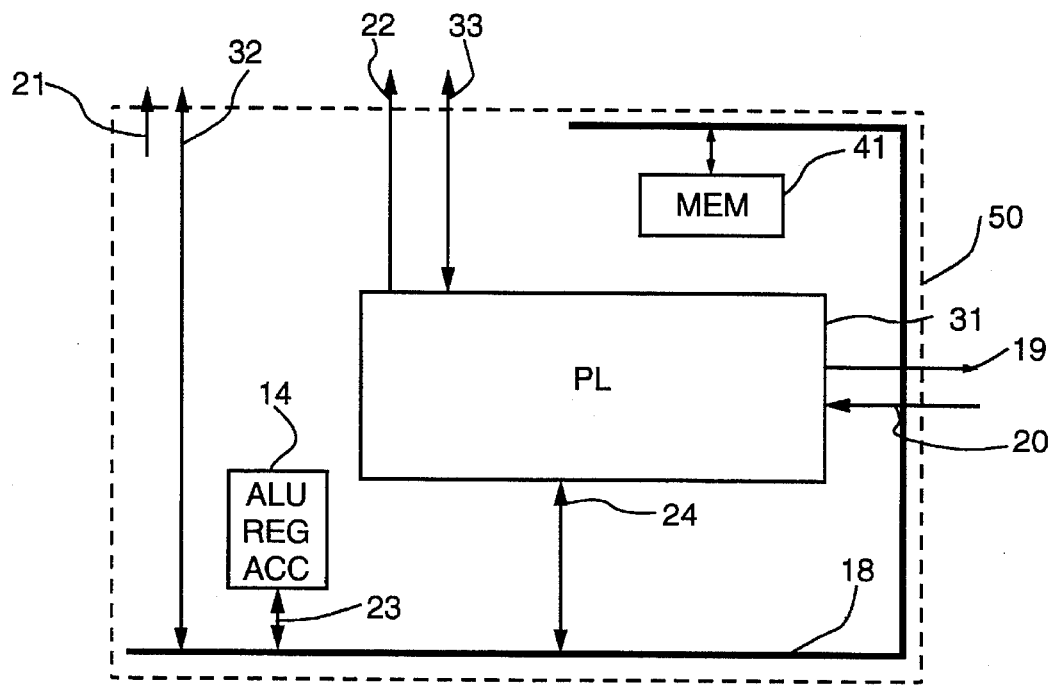
FIG. 9 shows a third embodiment using the present invention.

FIG. 9 shows a third embodiment of the present invention. The third embodiment is different from the second embodiment in that the local memory 41 can directly be accessed also from the core part 14 through the bus 18. By using this configuration, the core part 14 can share the local memory with the PL part 31, and signals can be transferred through the memory. It is also possible to connect a plurality of memories to the bus instead of just the one memory as shown in FIG. 9. To avoid the competition between the core part 14 and the local memory of the PL part 31, a signal line is necessary which carries a busy signal when either the part 14 or the memory 41 uses the local memory.

Figure 10:
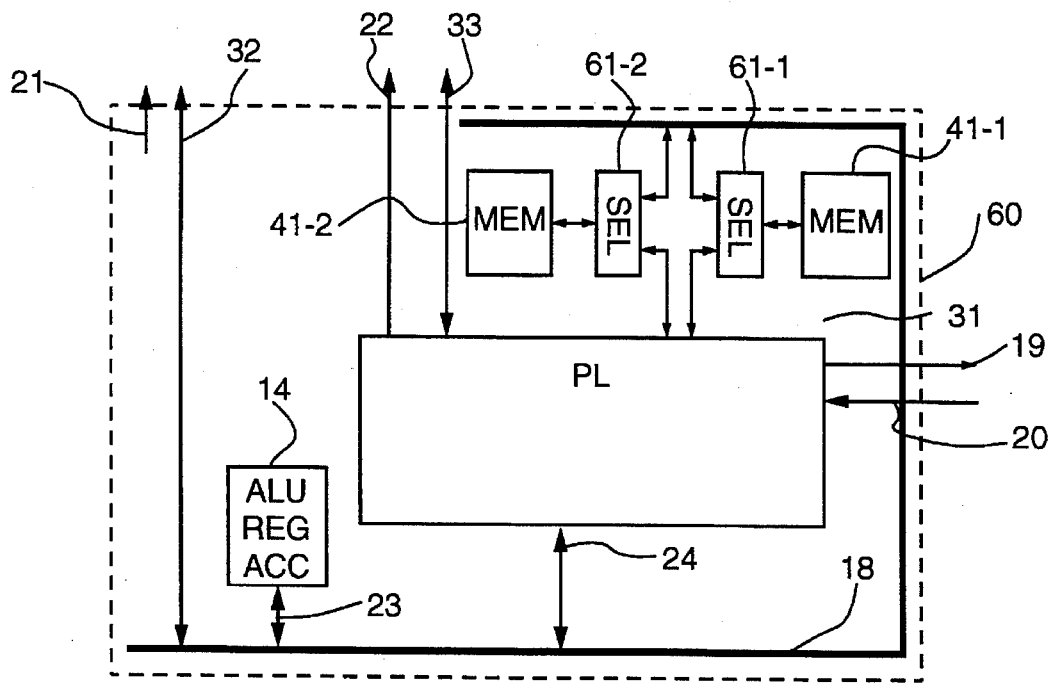
FIG. 10 shows a fourth embodiment using the present invention.

FIG. 10 shows a fourth embodiment of the present invention. The fourth embodiment is different from the third embodiment in that the local memory includes units of memory 41-1 and 41-2 that are connected to either the core part 14 or the PL part 31 by respective selection circuits 61-1 and 61-2. By using this configuration, the core part 14 and the PL part 31 can use the local memory by time-sharing. Pipeline processing in which pre-processing is executed by the core part 14 and post-processing is executed by the PL part 31 (and vice versa) is realized by using two memory units, connecting one of them to the core part 14 and the other to the PL part 31, and switching the parts by a command of the core part, PL part, or an external signal whenever a unit processing ends as shown in FIG. 10.

Figure 11:
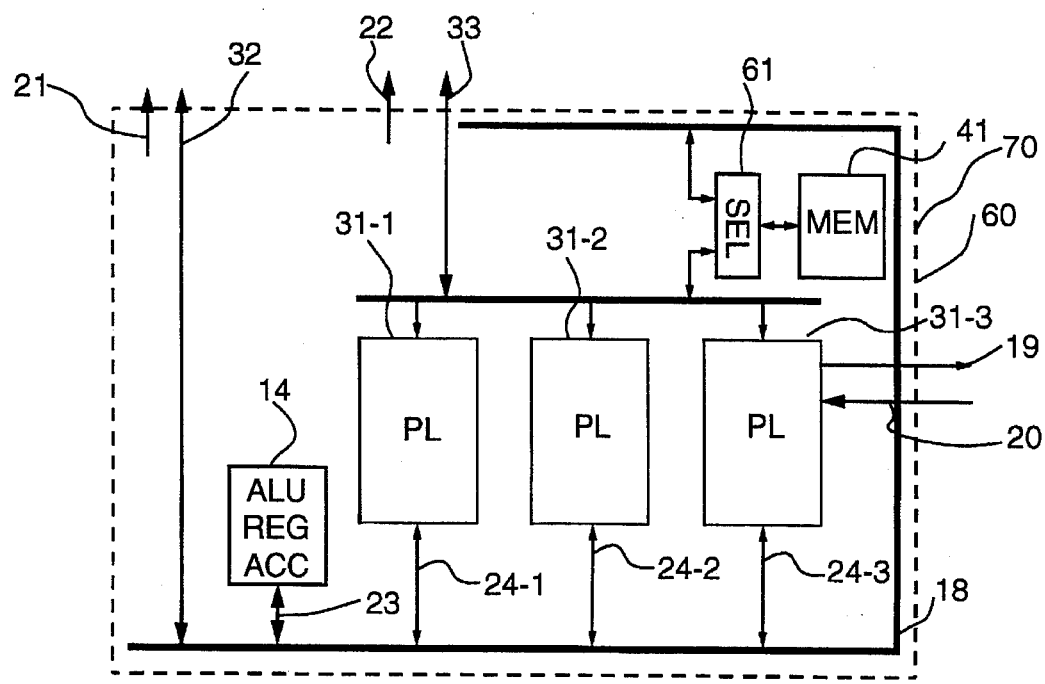
FIG. 11 shows a fifth embodiment using the present invention.

FIG. 11 shows a fifth embodiment of the present invention. In the fifth embodiment, a PL part is divided into a plurality of banks of separately programmable logic units 31-1, 31-2, 31-3 capable of functioning independently. Because signals can freely be exchanged between the banks, it is logically possible to execute the same processing as that of the above embodiment. The fifth embodiment is characterized in that circuit configuration data can be changed for each bank. For example, it is possible to change the circuit configuration data of the bank 31-3 while executing the processings of the banks 31-1 and 31-2. It is also possible to notify the core part 14 or other PL banks of the end of transferring of circuit configuration data by using a flag showing the end of the transferring of the data. To transfer the circuit configuration data, a function of fixing an output signal to a value is used so as not to affect peripheral banks or the core part. This function can also be realized by notifying other PLs that the circuit configuration data is being transferred, and executing the appropriate control for preventing erroneous operations in each PL or PL bank.

In FIG. 11, each PL may be either a logically divided part of a single PL or a plurality of separate PLs, connected together by a PL bus. If each PL has the same circuit part, it is possible to write circuit configuration data values to the corresponding PLs at the same time.

Figure 12:
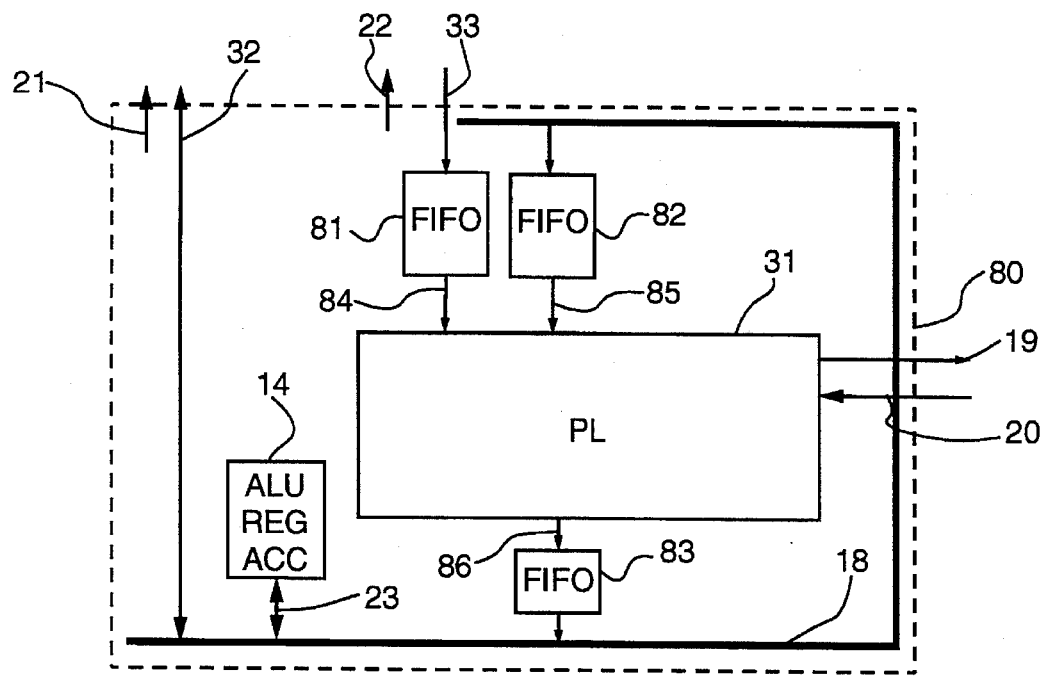
FIG. 12 shows a sixth embodiment using the present invention.

FIG. 12 shows a sixth embodiment of the present invention. In the sixth embodiment, buffers are used in the input/output paths of PL part 31. FIG. 12 shows an example in which FIFO memories 81, 82, and 83 are used as buffers. By using the FIFO memories, it is possible to easily exchange signals even if the internal signal transfer rate of the PL part 31 is different from that of the external signal transfer rate. Moreover, even when the processing speed external of the PL part 31 is variable, it is possible to absorb the fluctuation in the processing speed. The functions of starting the processing of the PL part 31 when the quantity of data stored in an FIFO memory exceeds a predetermined value and of outputting control data to stop the processing when the quantity of data in the FIFO memory exceeds another predetermined value can be provided by the FIFO memory by including a capacity indicating function, according to the present invention. The buffer circuit is not limited to using only FIFO memories, and one or more conventional memories can be used, where preferably part of them are used for only reading and the rest for only writing.

Figure 13:
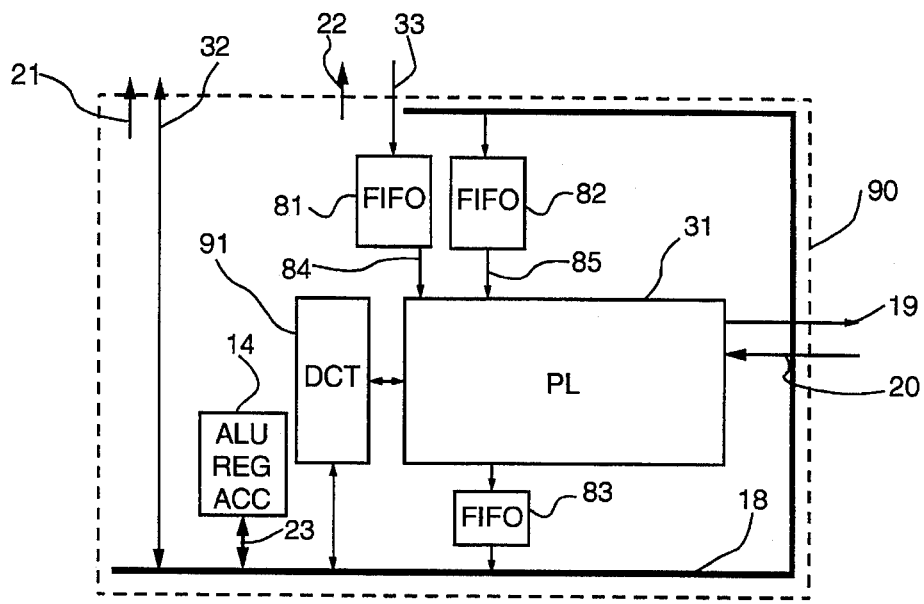
FIG. 13 shows a seventh embodiment using the present invention.

FIG. 13 shows the seventh embodiment of the present invention. The seventh embodiment includes an additional exclusively used circuit as compared with the sixth embodiment. In FIG. 13, a DCT circuit 91 is added. The reason for adding an exclusive circuit is that a PL part has lower efficiency than an exclusive circuit in view of the area on a chip. Therefore, it is possible to improve the integration degree of the circuit by adding a dedicated circuit as shown in FIG. 13.

Figure 14:
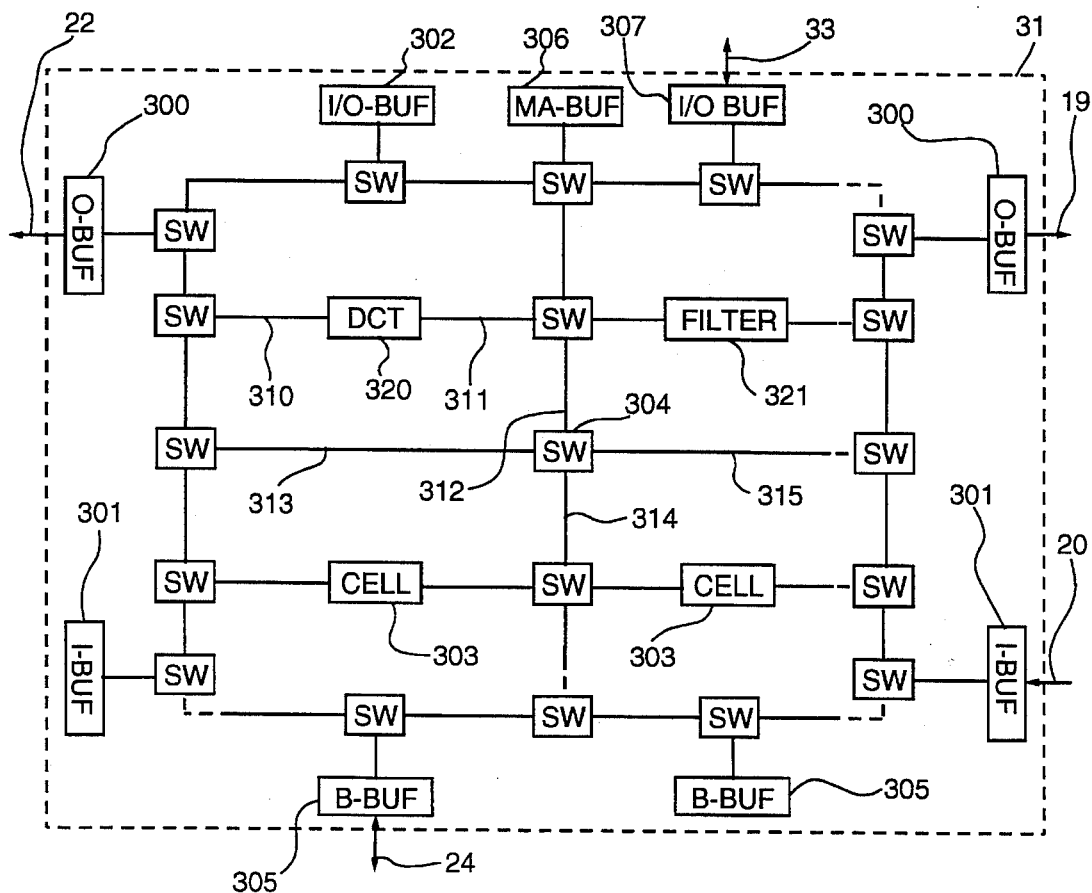
FIG. 14 shows a modification of the programmable logic part of FIG. 4.

FIG. 14 shows a modification of the programmable logic part in FIG. 4. In FIG. 14, some arithmetic cells are replaced with dedicated circuits. In the modification in FIG. 14 a DCT circuit 320 and a filter circuit 321 are used. The configuration in FIG. 14 is intended to improve the integration degree similarly to the configuration in FIG. 12. It is also possible to use a DSP and a CPU as dedicated cells. A modification in which all arithmetic cells are replaced with dedicated circuits is also possible, but versatility in signal processing is compromised as a result.

Figure 15:
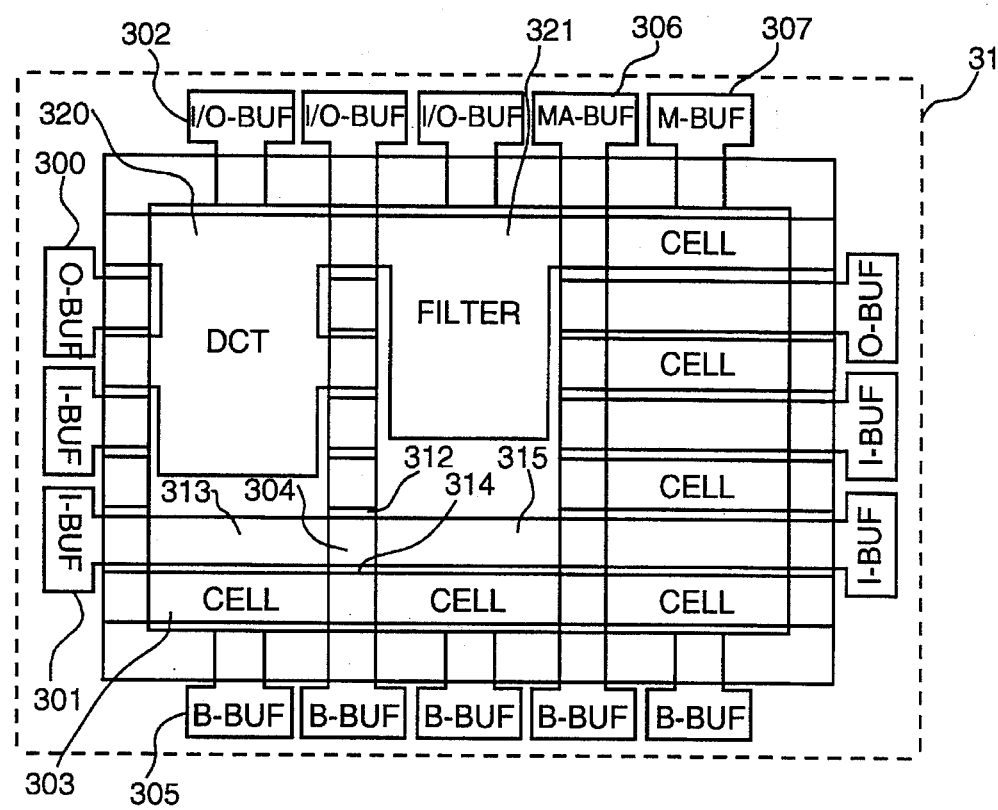
FIG. 15 shows a schematic layout of the block diagram of FIG. 14.

FIG. 15 shows an example in which the embodiment in FIG. 14 is shown as a layout on an actual chip. The DCT circuit 320 and the filter circuit 321 are arranged instead of cells. An efficient layout is realized by equalizing the width of the dedicated circuits to that of the cells. Moreover, the regularity of the bus switch positions is not impaired by setting the lengths of the dedicated circuits to a value of an integral multiple of the sum of the lengths of the cells and the width of a bus in the horizontal direction.

Figure 16:
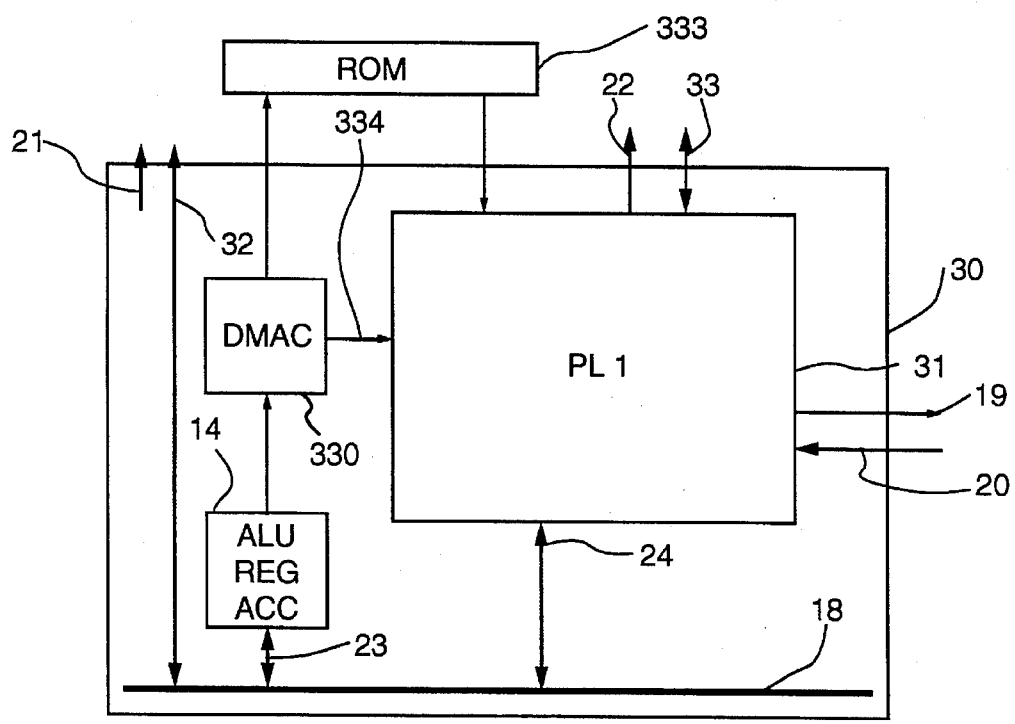
FIG. 16 shows a modification of the digital signal processor of FIG. 3.

FIG. 16 shows a modification of the embodiment of FIG. 3. In the embodiment of FIG. 3, circuit configuration data is transferred through the bus 18. In this modification, however, because the bus is occupied, if the processing mode of, e.g., FIG. 11 is employed, other processings are obstructed. In the modification of FIG. 16, an external ROM 333 is provided outside the DSP and a circuit configuration data transfer control circuit 330 (DMA controller) outputs control signals 331 and 334 in accordance with a command from the core part 14 to transfer circuit configuration data through a signal line 332. The signal line 332 has a bus configuration like that shown in FIG. 11. Moreover, it is possible to use the signal line 332 in common with other buses such as a program bus. Furthermore, it is possible to arrange the ROM 333 internally of the DMAC processor 330. Furthermore, it is possible to transmit the circuit configuration data not only from the ROM but through a storage medium such as a magnetic disk or optical disk, or through a communication circuit. It is also included in the present invention that a transfer command is issued by the PL part 31 or inputted from the outside of the processor 30.

Figure 17:
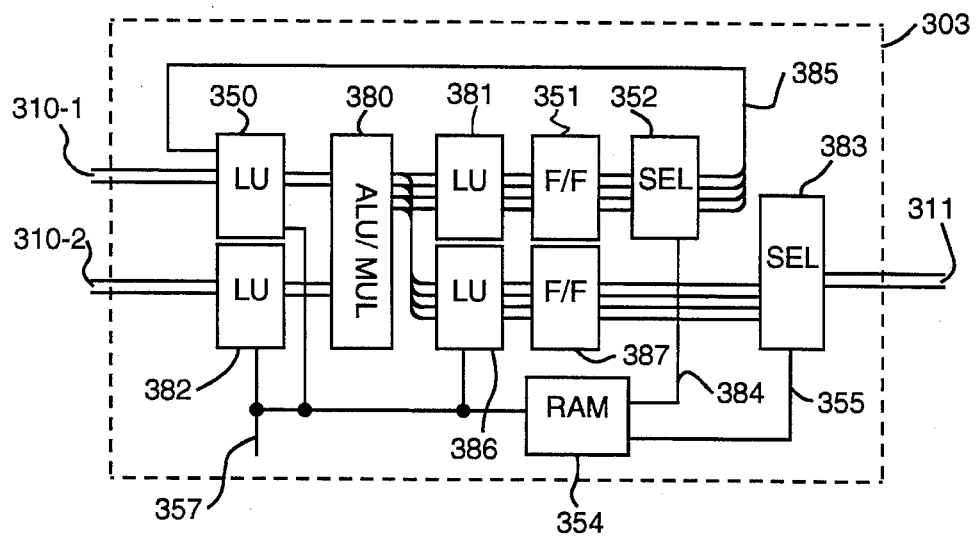
FIG. 17 shows a modification of the arithmetic cell of FIG. 5.

FIG. 17 shows a modification of the arithmetic cell 303 of FIG. 5. In the modification in FIG. 17, a multiplier-accumulator can be formed using one cell. Two-bit input signals 310-1 and 310-2 are inputted to execute a preprocessing by arithmetic and logic circuits 350 and 382. The pre-processing result is inputted to an integrating circuit 380. The integration result is sent in two data flows. The result is inputted in one flow to the arithmetic and logic circuit 350 through a feedback signal line 385 and through the arithmetic circuit 381, flip flop 351, and bit selection circuit 352, which is connected to RAM 354 by single line 384, for post-processing. In the other flow, the result is outputted to an output line 311 through an arithmetic circuit 386, flip flop 387, and bit selection circuit 383 for post-processing. Thus, an accurate feedback processing is realized by executing processings independently for a feedback system and an output system.

Figure 18:
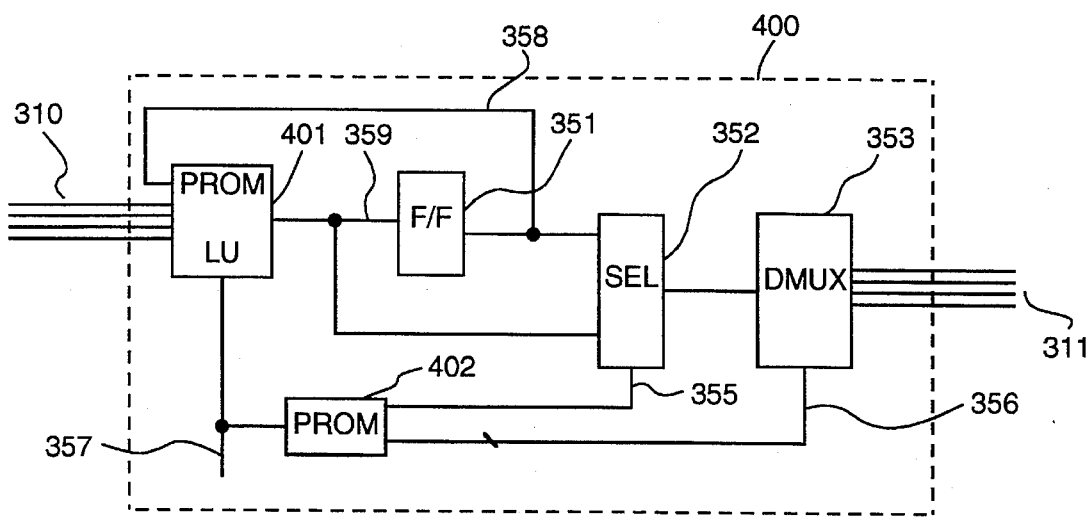
FIG. 18 shows a non-volatile arithmetic cell.

FIG. 18 shows a modification of the arithmetic cell part of FIG. 5. The modification in FIG. 18 is constituted by replacing the memory part 354 and arithmetic and logic circuit 350 of FIG. 5 with non-volatile memories with logic units, such as PROMs (Programmable ROMs) 402 and 401, respectively. By storing circuit information in a non-volatile memory, it is possible to decrease the circuit configuration data transfer time of a frequently-used circuit. A RAM with backup, EPROM (Electrically Programmable ROM), EEPROM (Electrically Erasable and Programmable ROM), or flash EEPROM can be used as THE nonvolatile memories 401 AND 402.

Figure 19:
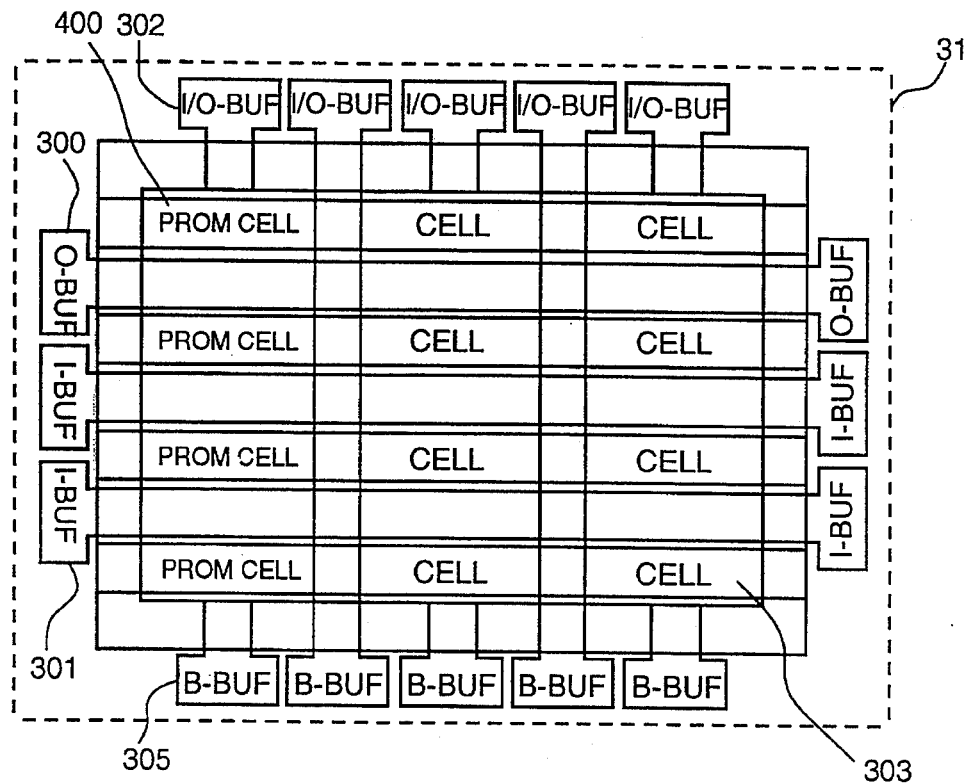
FIG. 19 shows a schematic layout using non-volatile cells.

FIG. 19 shows chip layout similar to that shown in FIG. 15, implementing the circuit of FIG. 18. In particular, unlike the layout shown in FIG. 15, part of a non-volatile cell 400 is provided together with part of a normal cell 303 in the FIG. 19 embodiment.

Figure 20:
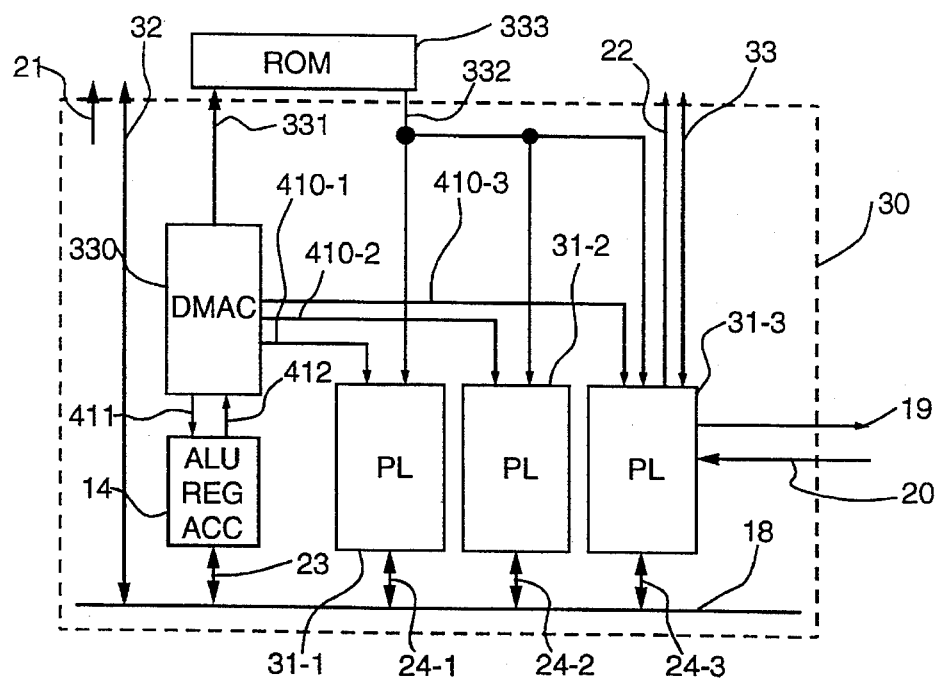
FIG. 20 shows a modification of the arithmetic cell part of FIG. 5.

FIG. 20 shows a further modification of the modification in FIG. 16. The PL part 31 is divided as in FIG. 11, and a circuit configuration data transfer control circuit 330 (DMA controller) can transfer circuit configuration data separately to each PL section or bank by a respective control line 410-1, 410-2 and 410-3 through the signal line 332 under control of the core part 14, which communicates to the DMAC 330 through lines 411 and 412. By using the circuit arrangement of FIG. 20, it is possible to transfer circuit configuration data to, for example, the PL section 31-3 while processing signals by the PL sections 31-1 and 31-2 and the core part 14.

Figure 21:
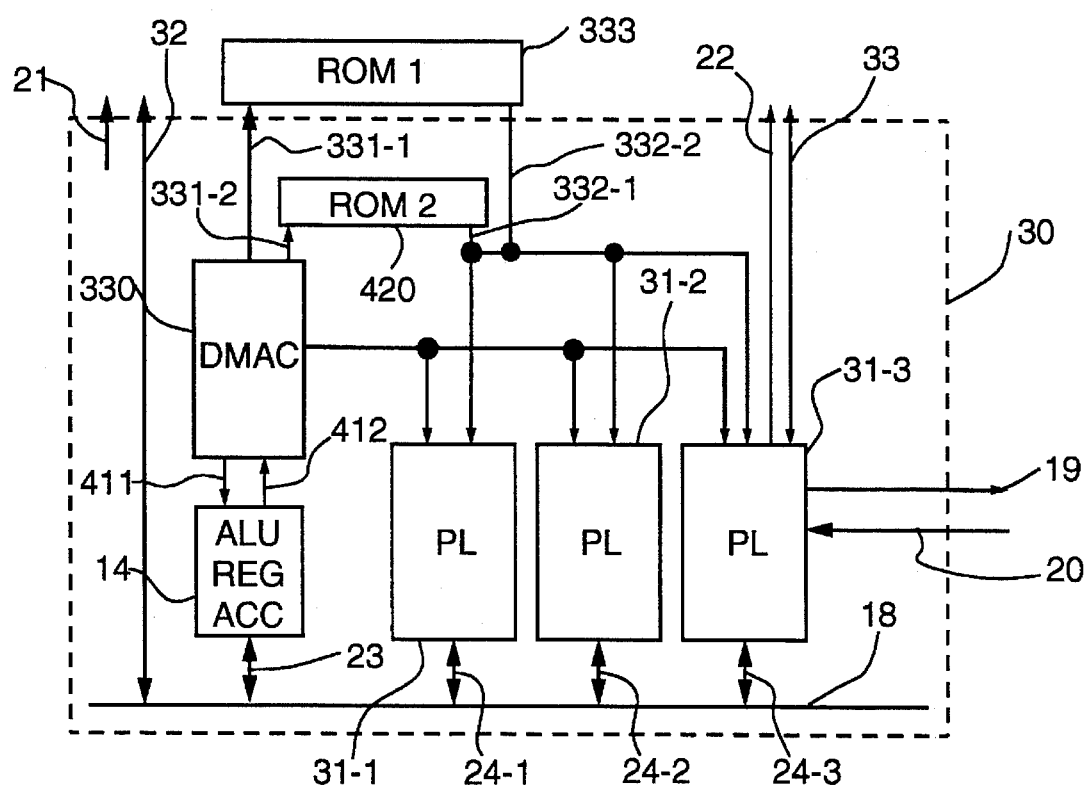
FIG. 21 shows a further modification of the arrangement of FIG. 16.

FIG. 21 shows a circuit arrangement for storing circuit configuration data in an internal ROM 420 as a further modification of the FIG. 20 arrangement. ROM 1 333 and ROM 2 420 are connected to DMAC 330 through lines 331-1 and 332-2, respectively, and to each of the PL sections through lines 332-1 and 332-2, respectively. By storing some or all of the circuit configuration data values of a frequently-used circuit, used in the digital signal processor 30, it is possible to decrease the capacity of the external ROM 333 or omit the external ROM 333.

For the above embodiments, it is possible to use the ROM 333 or 420 also as a ROM for storing the program of the core part 14.

Figure 22:
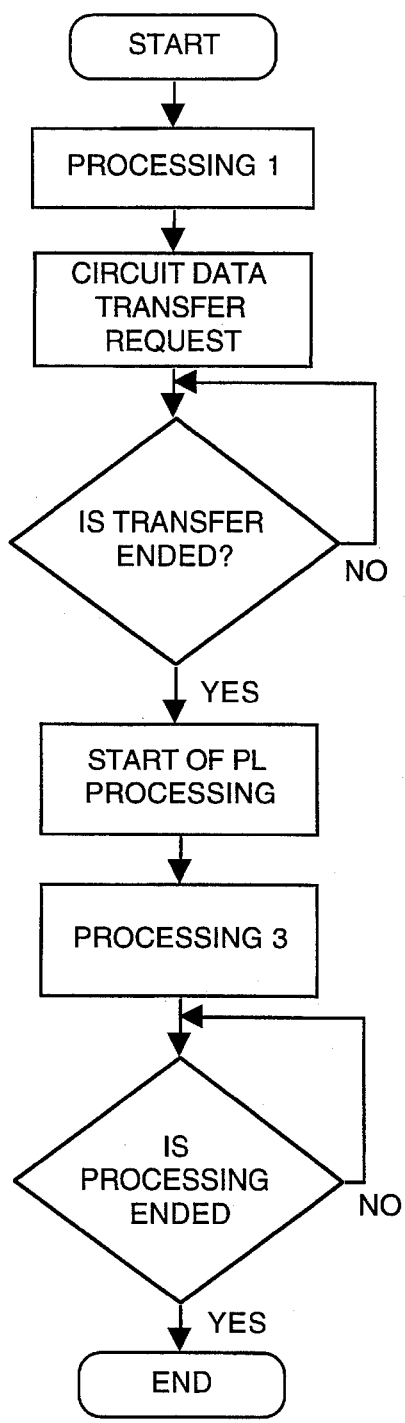
FIGS. 22(a) and 22(b) are flow charts showing signal processing using the digital signal processor of the present invention.
Figure 22:
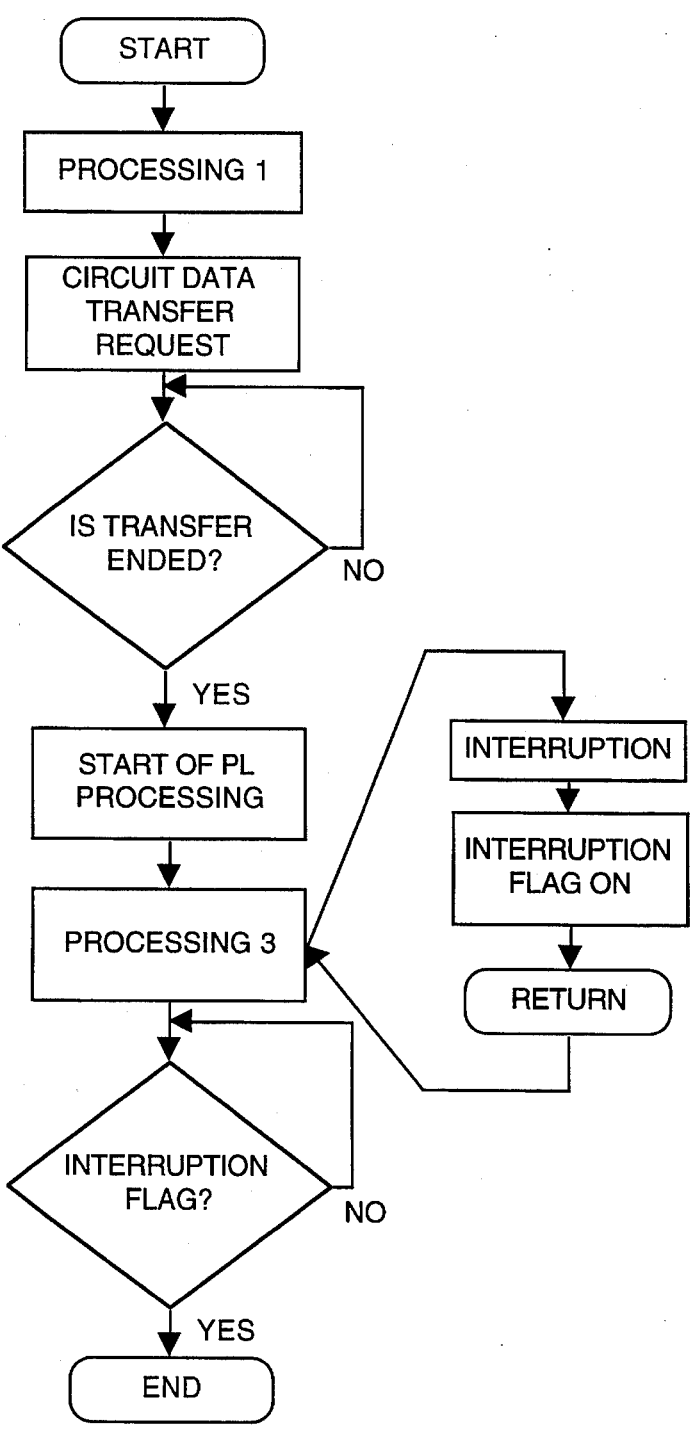

FIGS. 22(*a*) and 22(*b*) show flow charts of signal processing executed by the digital signal processor of the present invention. These figures show an example in which processings 1, 2, and 3 are independently executed and the processing 2 is executed by using a PL. Two processings such as polling and interruption are shown as examples. It is common to first execute the processing 1 and then transfer circuit configuration data for performing another processing method. In the case of polling, an execution instruction is outputted to a PL part to execute the processing 3 while the processing 2 is executed. A signal sent from the PL part is inspected to monitor the end of processings during the execution of or after the end of the processing 3.

In interruption, the end of the processing 2 is reported to the core part 14 by an interrupt signal during the execution of or after the end of the processing 3. When an interrupt occurs, a flag indicating that the processing 2 has ended is set and the original processing is restarted.

Figure 23:
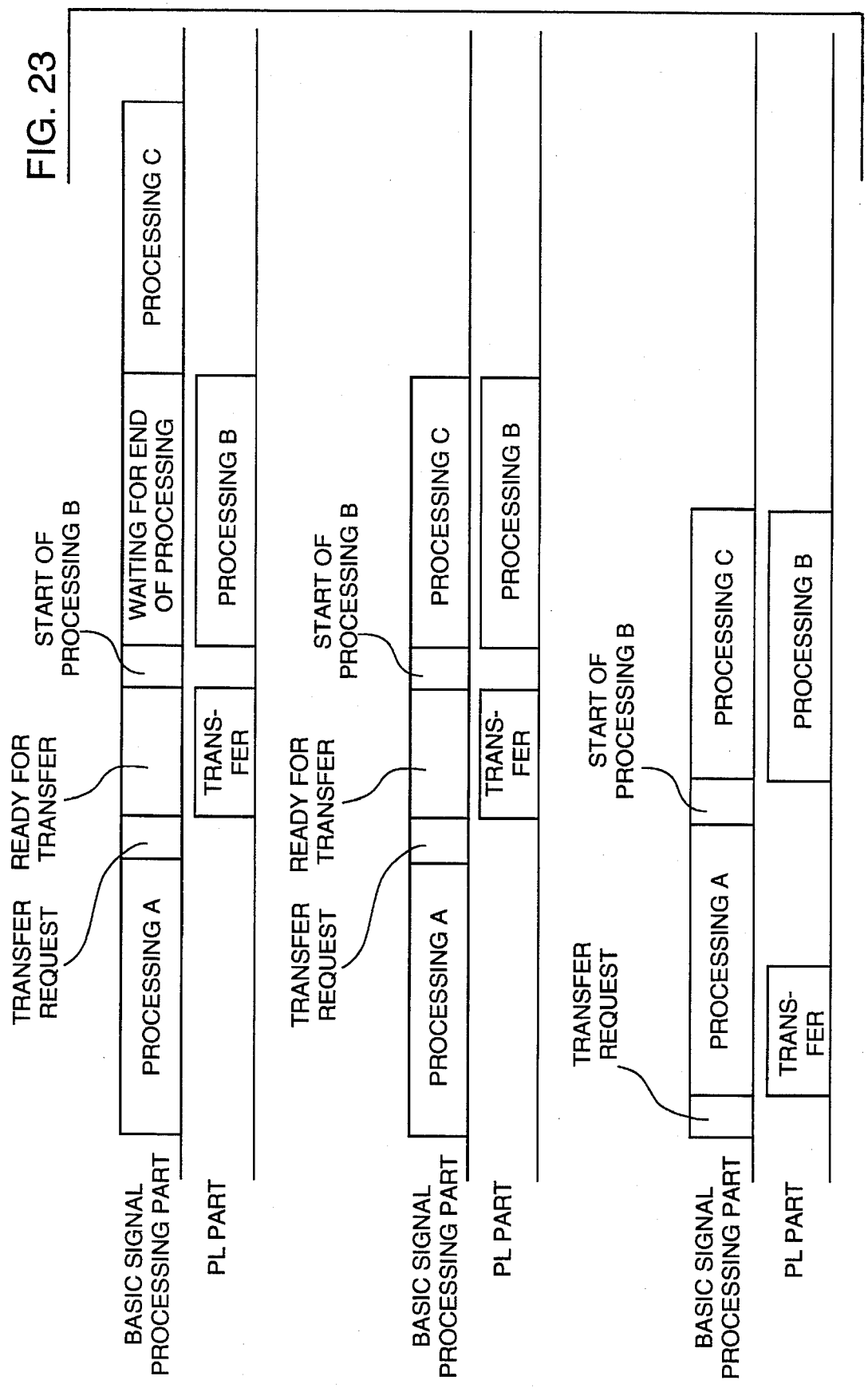
FIG. 23 is a timing chart showing signal processing using the digital signal processor of the present invention.

The timing charts of FIG. 23 illustrate the execution states of three processings A, B, and C. In FIG. 23, sequential processing of Item (1) is a method for executing the processing C after the end of the processing B. The result of the processing B is used for the processing C when the execution time of the processing B is very short. The parallel processing 1 of Item (2) is a method for executing the processing C immediately after the start of the processing B. Each of the flow charts of FIGS. 22(*a*) and 22(*b*) show examples of this method. The processing B and the processing C must be independent of each other. When the execution time of the processing B is almost equal to that of the processing C, the processings can be executed most efficiently. For the parallel processing 2 of Item (3), the execution method of the processings B and C is the same as that of the parallel processing 1. However, the former method is different from the latter in that circuit configuration data transfer is performed in parallel with the processing A by performing the circuit configuration data transfer of the processing B before starting the processing A. This is effective when it takes a long time to perform circuit configuration data transfer. However, it is impossible to execute the processing of the PL part in the processing A. As shown by the example, when changing the circuit configuration in the PL part during execution of a processing, it is possible to improve the processing efficiency by outputting a circuit configuration data transfer request not immediately before the processing but before starting a processing which can be executed in parallel with the circuit configuration data transfer (that is, a processing not requiring the processing of the PL part). Any combination of Items (1) and (2) in FIGS. 22(*a*) and 22(*b*) and Items (1), (2), and (3) in FIG. 23 can be performed.

FIGS. 24, 25, 26, 27(*a*) and 27(*b*) show examples in which the digital signal processor of the present invention is used to code a dynamic image signal.

Predictive coding and DCT are often used together to code a dynamic image signal. Predictive coding is a method for holding an image last transmitted, generating a predictive signal from the last-transmitted image when transmitting the next image, and transmitting the difference from the predictive signal. Dynamic image coding is generally classified into the following three types of processings. The first one is a processing (MC: Motion Compensation) for measuring the motion of each part of an image to obtain motion compensation vectors, the second one is a processing for applying a discrete cosine transform to a differential signal between a predictive image and an image to be coded (DCT), and the third one is a processing (coding) for variable-length-coding of the results of the DCT and other additional data. In the case of MC processing, an image to be coded (coded image) is divided into macro blocks (MBs) each comprising, e.g., 16×16 picture elements to detect the most similar part from the last coded image (reference image) for every MB. To measure the similarity, the absolute value of the sum of the differences between picture element signals is used for each picture element. The minimum absolute-value sum computed is assumed to have the highest similarity and is used as a predictive signal. The position of the predictive signal expressed by a relative position from the position of an MB to be coded is referred to as a motion compensation vector (MC vector). The MC vector is transmitted to the receiving side when the variable length coding which will be described later is performed. In the second (DCT) processing, a predictive image is generated by using the previously-obtained motion compensation vector, the difference from the coded image is determined, and the differential signal is converted by means of DCT. In the third (variable length coding) processing, the DCT results and MC vectors are converted into variable length symbols in order to encode them for transmitting.

Figure 24:
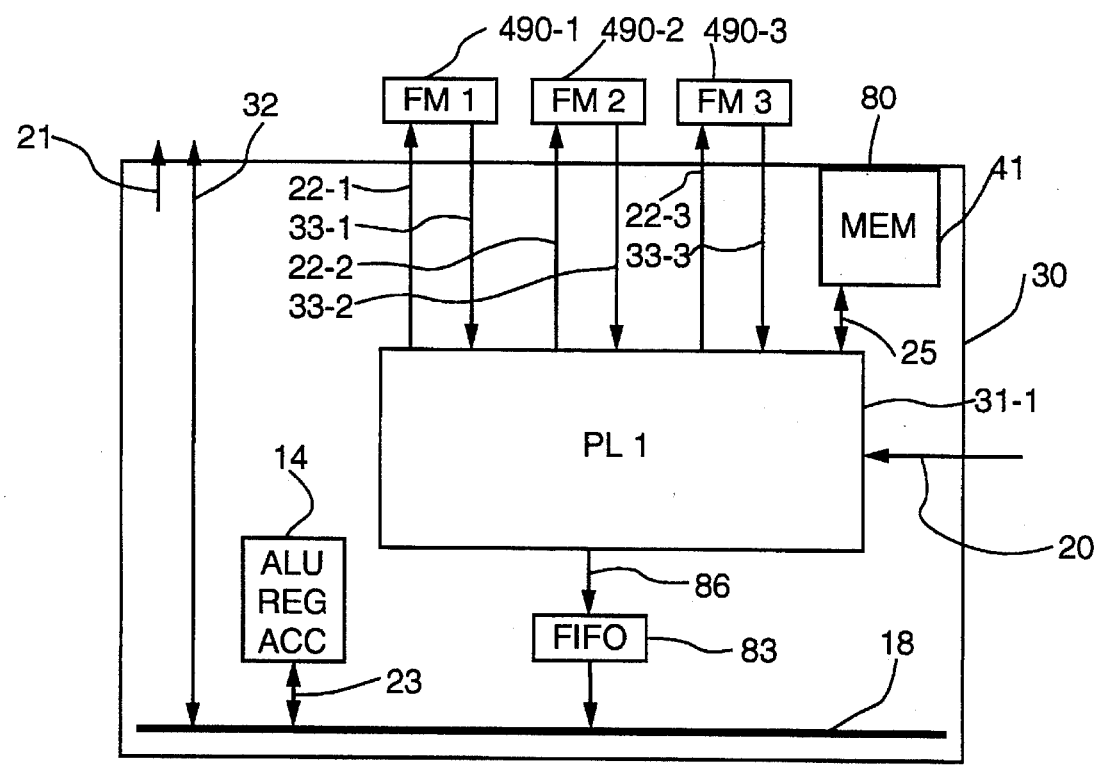
FIG. 24 shows a configuration in which the DSP of the present invention is applied to dynamic image coding.

FIG. 24 shows a configuration for executing the above processings. The configuration is a modification of the second embodiment of the present invention. A programmable logic part PL1 31-1 is connected to three external memories 490-1, 490-2, and 490-3 through respective pairs of signal lines 22-1, 33-1; 22-2, 33-2; and 22-3, 33-3. PL1 is also connected to an internal memory 41 through a line 25 and also to a FIFO memory 83 through a line 86. Each external memory can hold signals of one image, so that a coded image, reference image(s), and next coded image (input image) are stored or held. These three types of images are handled as different types of image memories after the data of one image is coded. That is, a reference image of the next frame is written in a coded-image memory during coding and used as a reference-image memory. The reference-image memory is used for inputting an image at the next frame and an input-image memory is used as a frame coding memory of the next frame.

The internal memory 41 holds the motion compensation vectors of a frame to be coded. The FIFO 83 temporarily holds the result of the DCT.

Figure 25:
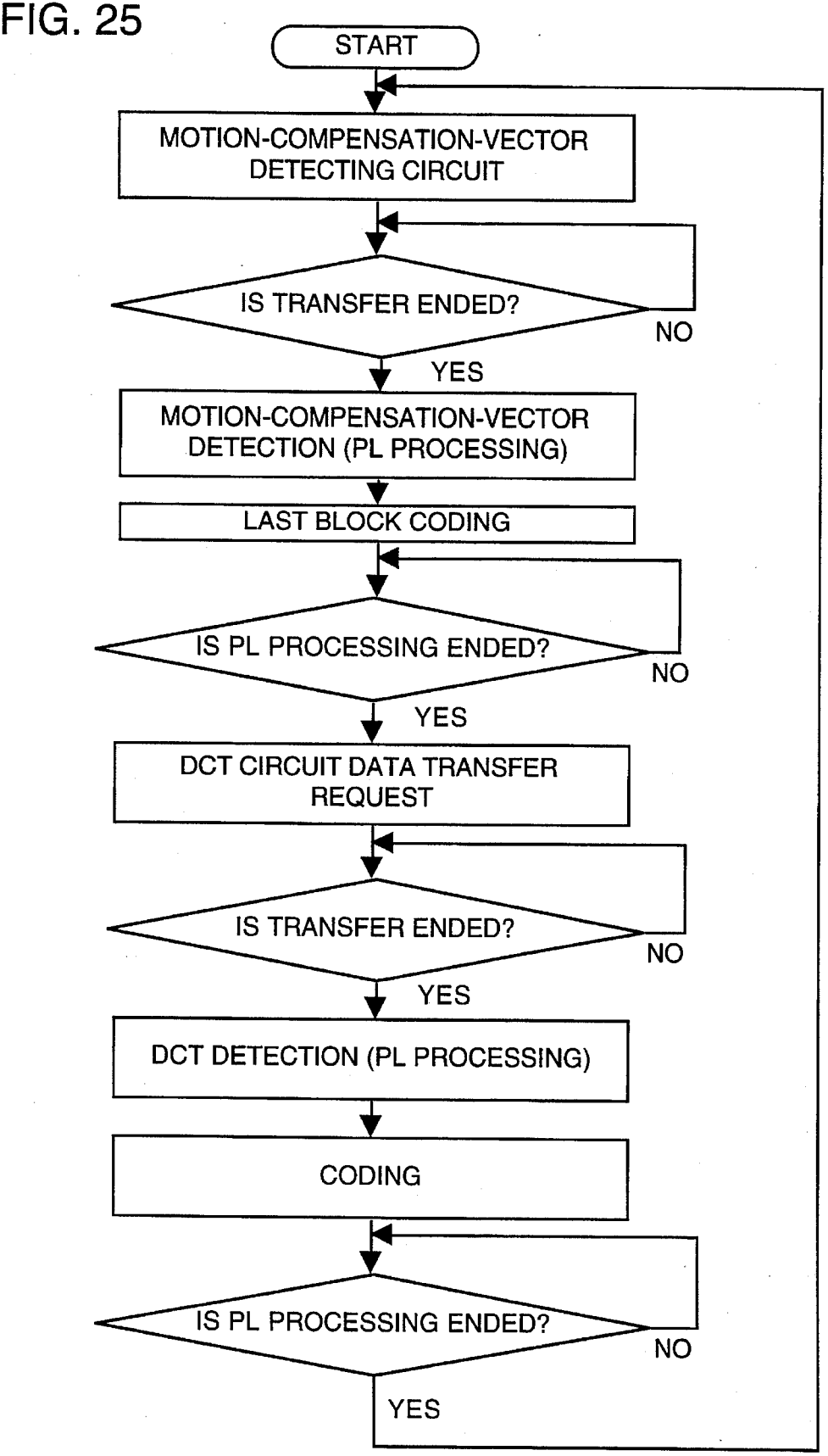
FIG. 25 shows a flow chart of the coding of FIG. 24.
Figure 26:
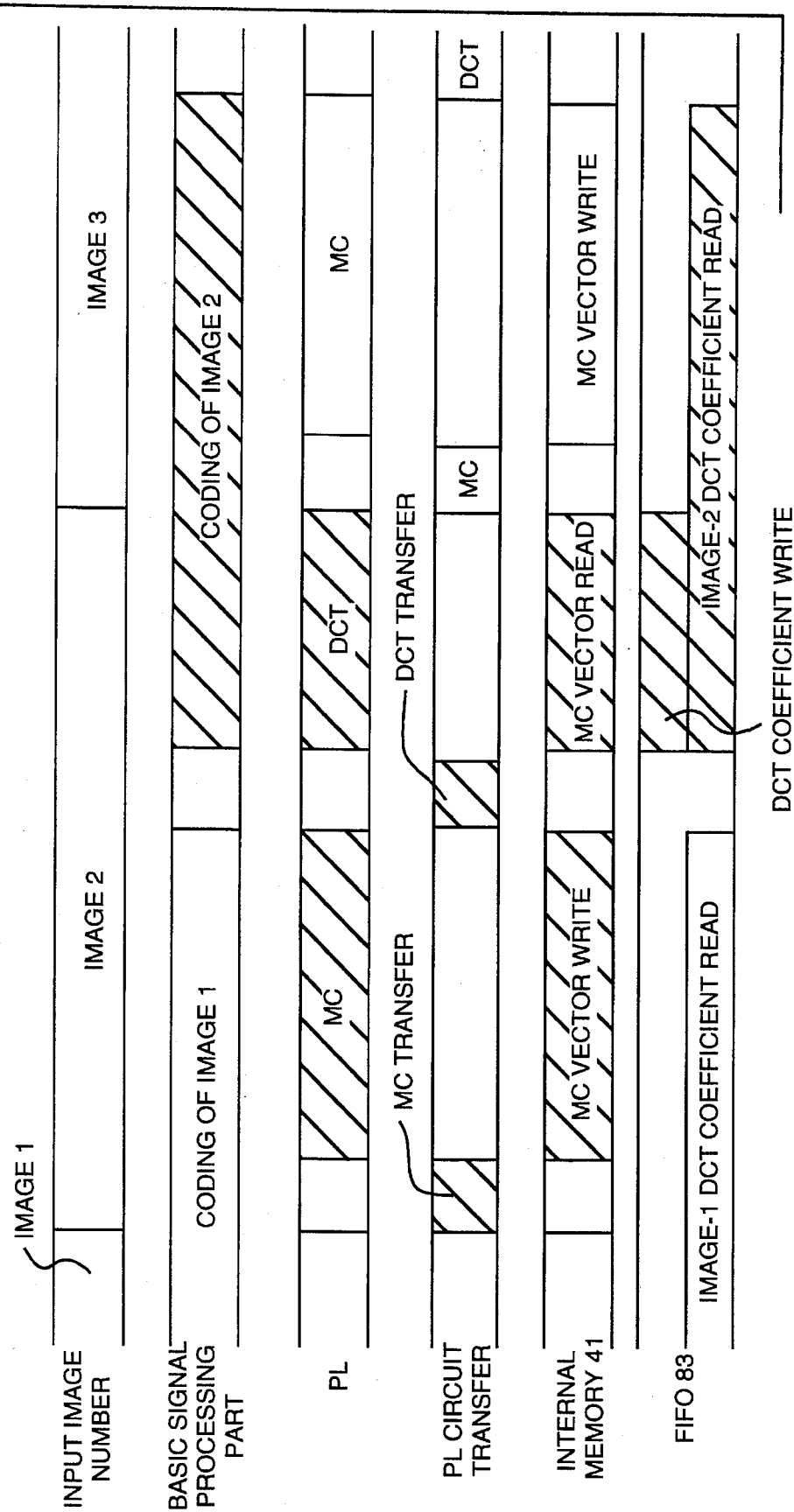
FIG. 26 shows a timing chart of the coding of FIG. 24.
Figure 27:
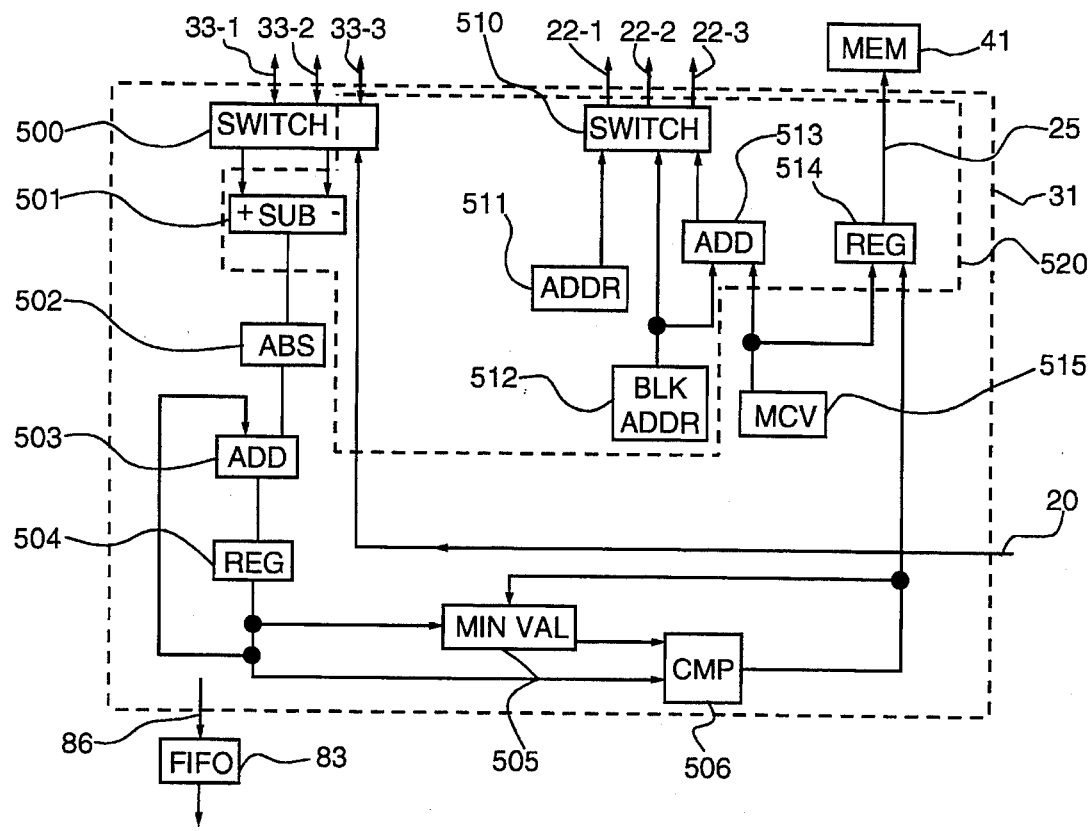
FIGS. 27(a) and 27(b) show circuit configurations for the programmable logic part for the coding of FIG. 24.
Figure 27:
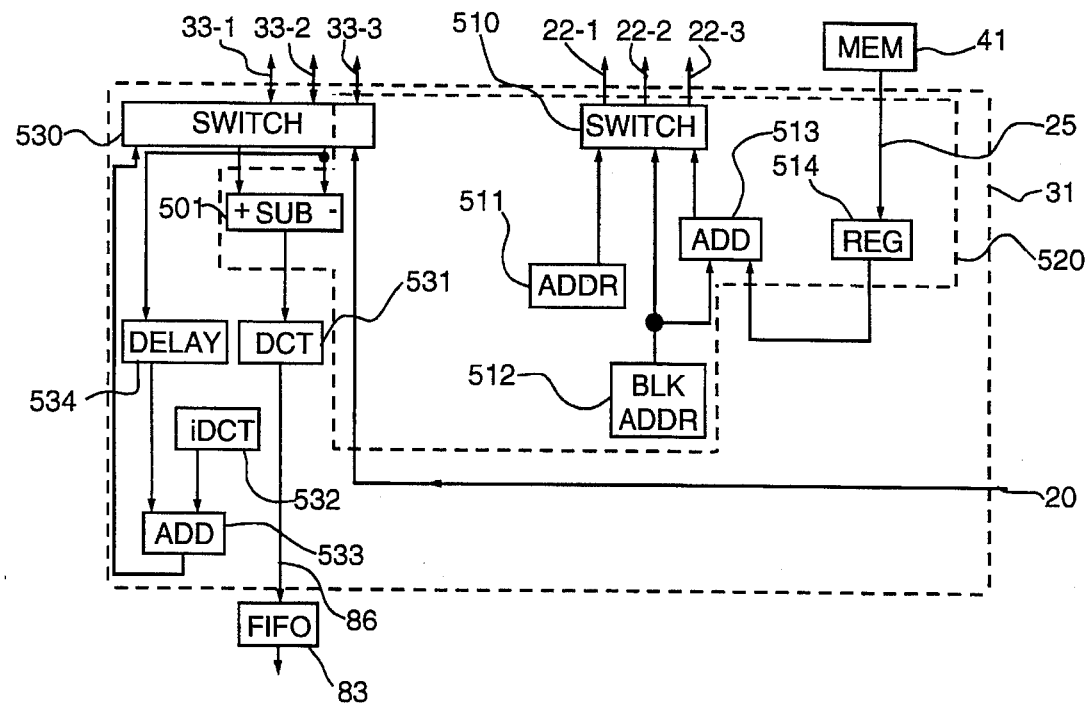

FIGS. 25 and 26 are directed to coding. FIG. 25 shows the coding in the form of a flow chart and FIG. 26 shows it in the form of a timing chart. In the coding in a PL part, the one-frame input time (e.g., 33 ms) is halved and MC is performed in the first half and DCT is performed in the second half. A core part performs coding between the second half of the above time and the first half of the next frame processing.

More specifically, with reference to FIG. 25, first the circuit configuration data of MC processing is transferred to the PL part at the beginning of a frame. After the transfer ends, the core part codes the last frame while the PL part detects a motion compensation vector. The detected MC-vector value is stored in the internal memory 41. After both the MC processing and the last frame coding end, the circuit configuration data of DCT is transferred. After the data is transferred, DCT is started and DCT results are sequentially coded. In the DCT processing, MC vector data is read from the internal memory 41 to generate a predictive image in accordance with the vector values. The difference between the predictive image and a coded image is obtained and the coded image is converted through DCT. After the entire DCT ends in the PL part and the entire image of the next frame is inputted to an input image memory (33 ms after the transfer of MC circuit configuration data starts), coding is interrupted to perform the next frame processing. Then, the remaining coding of the first half of the next frame is performed. FIG. 26 shows a timing chart of the above operation.

FIGS. 27(a) and 27(b) show circuit configurations of the PL part 31 for performing MC and DCT. Hatched parts in FIG. 26 correspond to the processing of image 2.

To search a MC vector, the following processings are executed. First, the address of an MB to be coded is generated by a counter 512. A vector generated by an MC vector generation circuit 515 is added to the generated address by an adder 513 to generate the address for a reference image. An address counter 511 generates an address for writing the image signal 20 of the next frame inputted from the outside at a predetermined location of an external memory. These addresses (for a coded MB, reference, and input) are outputted to address lines 22-1, 22-2, and 22-3 of the external memory assigned at the point of time by a switch circuit 510. Picture elements specified by the coded-MB address and the reference address are inputted to the PL part by using two of the external data buses 33-1, 33-2, and 33-3 and then inputted to a subtracting circuit 501 by a switch 500. One MB of the absolute values of the subtraction results held in ABS 502 are accumulated in an adder 503 and register 504. The accumulated result is stored in a register 505 and also compared with the minimum value among the accumulated values of the same coded MB by a comparison circuit 506. When the result of the comparison shows the new accumulated value is smaller than the minimum value, the value is written in the register 505 and also the MC vector value at that time is written in a register 514. By executing the processing by the predetermined number of times for one coded MB while changing the MC vector value, the optimum MC vector is obtained in the register 514. After the processing for one MB ends, the vector value in the register 514 is written in the internal memory 41 over line 25. The input signal 20 is connected to a bus of an external memory assigned by the switch 500 and written in the external memory.

In the case of DCT, the addresses for three external memories are generated similarly to the case of MC processing. However, the vector value used for the reference address is stored in the internal memory 41 and read out therefrom. The difference between data values for MB and reference is detected by the subtracting circuit 501 similarly to the case of the above MC. The difference value is converted and quantized by a DCT circuit 531 and thereafter stored in the FIFO 83 serving as the interface with the core part. At the same time, the DCT results are inversely converted by an inverse-DCT circuit 532 and added by an adder 533 to the last signal generated by delaying the reference data so as to generate a reference image of the next frame. The reference image of the next frame passes through the switch 530 again and is written in an already-coded MB in a coded-image memory to serve as a reference image of the next frame.

Figure 28:
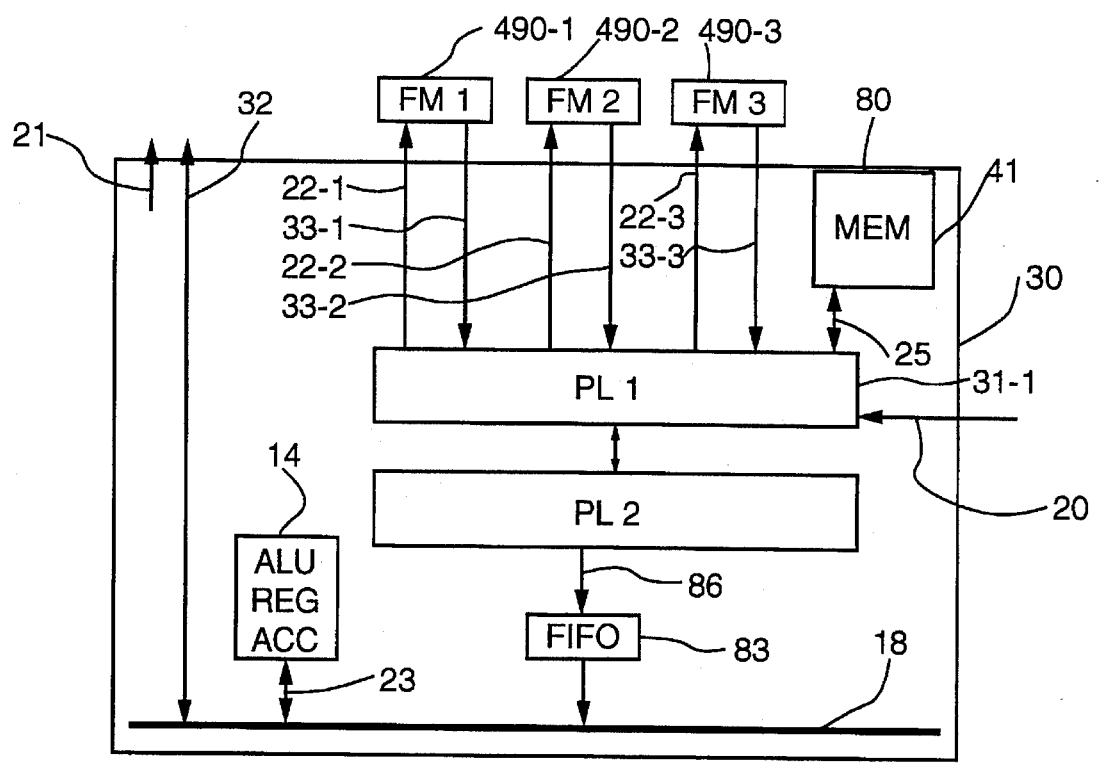
FIG. 28 shows a modification of the configuration of FIG. 24.
Figure 29:
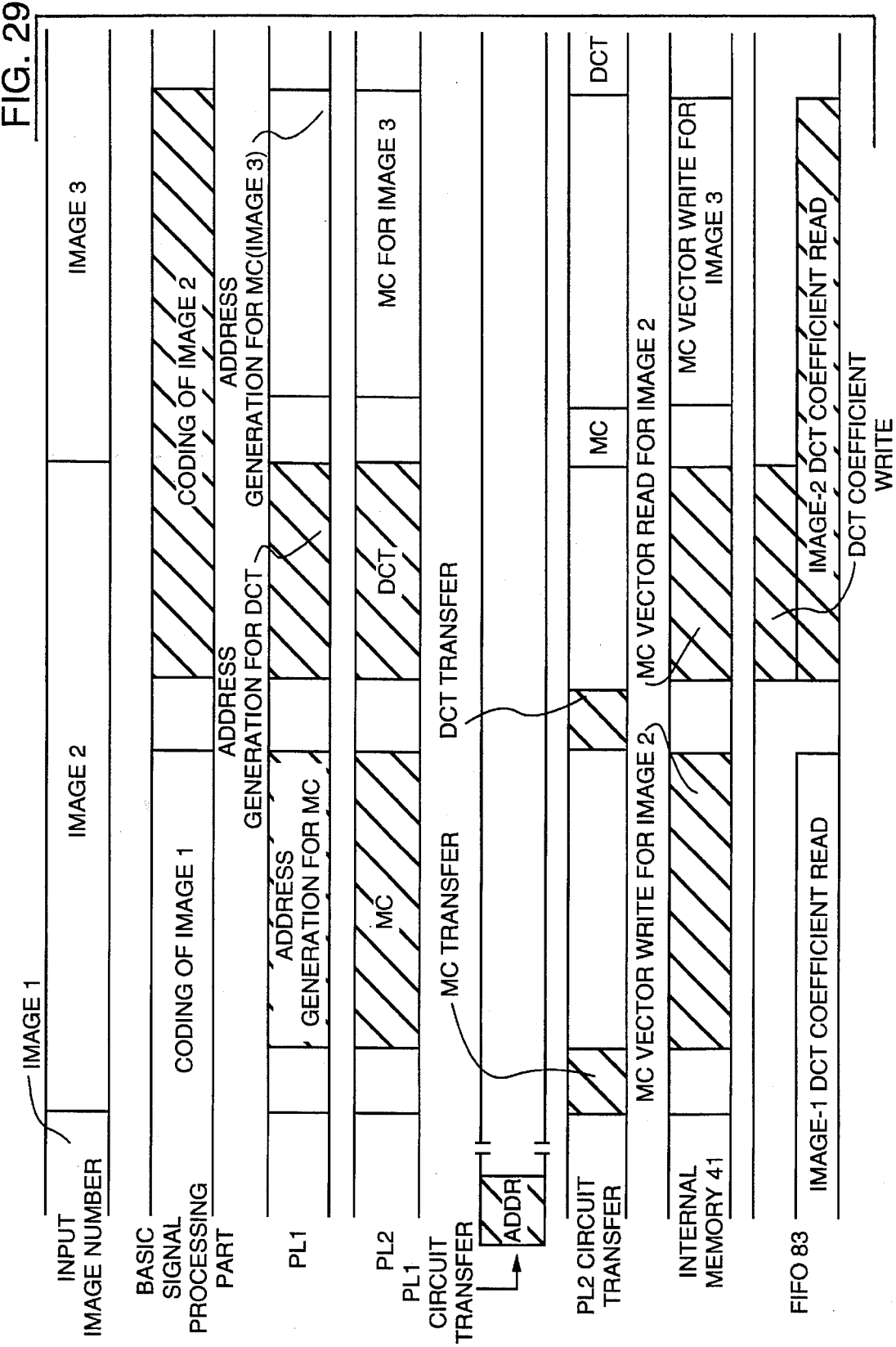
FIG. 29 shows a timing chart of the coding of FIG. 28.

Comparing the MC processing of FIG. 27(a) with the DCT processing of FIG. 27(b), it is found that an address generating part 520 denoted by a dashed line is used in common. FIG. 28 shows the circuit configuration of a modification using the above feature. In FIG. 28, two PL parts 31-1 and 31-2 are used and the address generating part 520 of the previous figures is assigned to the PL1 and a part dedicated to MC or DCT processing is assigned to the PL2. In the circuit of FIG. 28, the transfer of circuit configuration data for each frame is performed for only the PL2 as shown by the time chart of FIG. 29. Hatched parts in FIG. 29 correspond to the processing of image 2. Therefore, the transfer time can be decreased and moreover the capacity for circuit configuration data can be only for the PL2 by assigning the previous non-volatile cell to the PL1. Therefore, there is an advantage that the circuit scale can be decreased.

The digital signal processor of the present invention has been primarily described with respect to its use for image signal processing. However, the digital signal processor of the present invention can equally perform optimum audio signal processing by appropriately setting the configuration of the PL part.

Figure 2:
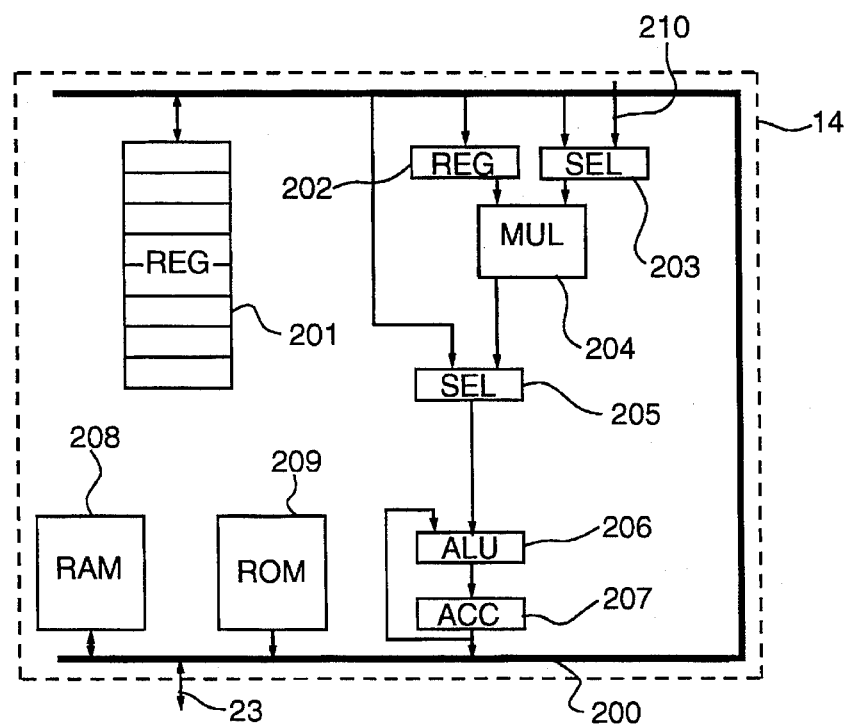
FIG. 2 shows an illustration of the basic signal processing part of the conventional digital signal processor.

That is, for audio signal processing including speech recognition, speech synthesizing, and speech processing, there are some frequently-used formatted processing routines. By providing an exclusive arithmetic circuit for executing the above formatted processings in a PL in the processor of the present invention in order that the core part comprising the accumulator, arithmetic and logic unit, registers, RAM, and ROM shown in FIG. 2 controls only the transfer of block data to be processed to the exclusive arithmetic circuit, the load of the core processing can be lightened and the description of the formatted routines in programming can be decreased. Moreover, as shown in FIG. 16, when a direct memory address controller (DMAC) is provided between the RAM and the PL in the core, it is possible to transfer the data in the RAM of the core and the data in an external memory to an exclusive arithmetic circuit in the PL independently of the operation of the core, and further to increase the core operation speed because the core can always use the first bus.

Figure 30:
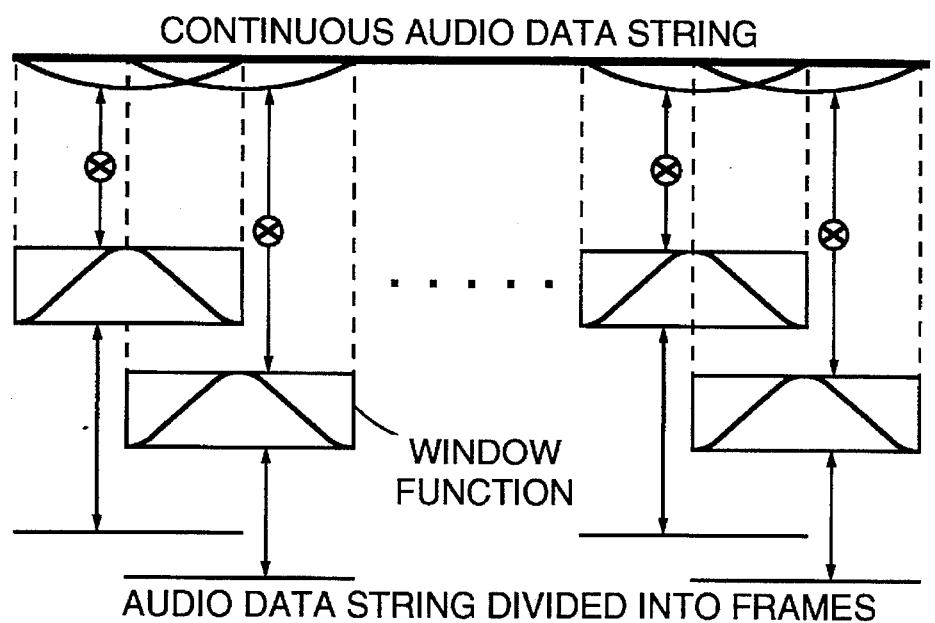
FIG. 30 shows an illustration of audio signal processing using frame processing.

Generally in speech recognition and speech processing, speech data is divided into frames having a certain time length and processed in units of one frame. Moreover, for speech synthesizing and speech processing, data of each frame is multiplied by a window function and the speech frame data is smoothly connected together to synthesize a continuous output of speech. FIG. 30 shows the concept of the above synthesizing. To decrease the load of the core part and the length of a program, it is desired that the above frame division/synthesizing be executed without control by the core part, and simultaneously that the audio signals be buffered with I/O buffers or with buffers in the processor, or with an external memory.

Figure 31:
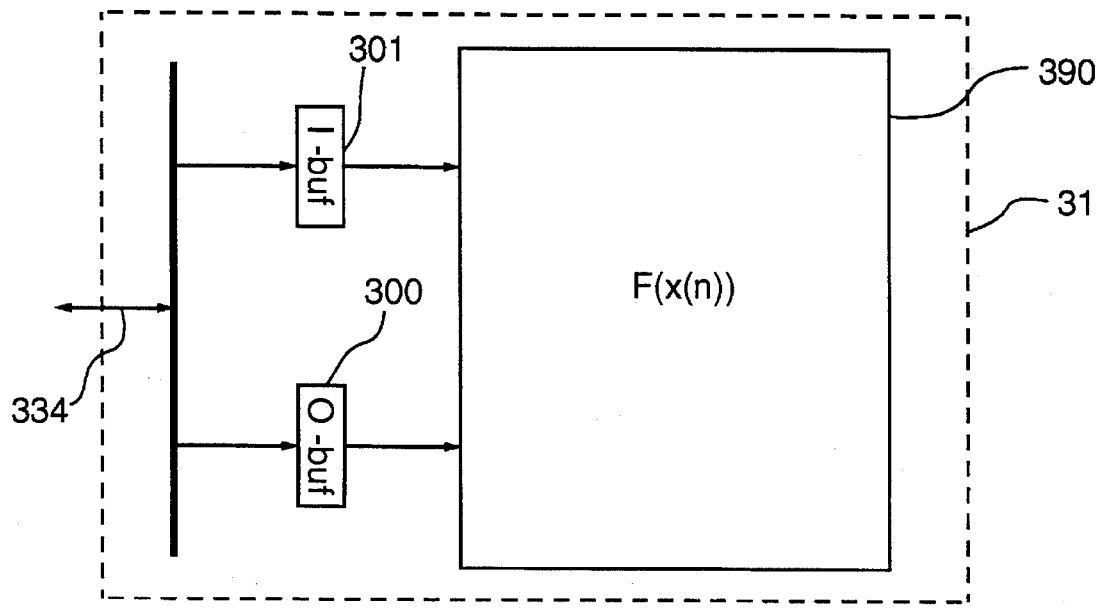
FIG. 31 shows a configuration of a programmable logic part for the processing of FIG. 30.

Using the processor of the present invention, it is possible to realize a means for performing frame division/synthesizing independently of the operation and control of the core part by forming a circuit as shown in FIG. 31. A PL 31 exclusively executes multiplication by a window function in accordance with the following equation by means of function calculation circuit 390 as shown in the figure.

$$y(n) = W_H(N) * x(n) \quad (4)$$

$$W_H(n) = 0.54 - 0.46\cos\left(\frac{2n\pi}{N-1}\right)$$

$$(n = 0, 1, \ldots, N-1)$$

In speech recognition and speech synthesizing, an autocorrelation function is often used as one of the processings for extracting features in speech. This is a function of multiplication-accumulation and is shown by the following equation.

$$\phi(m) = \frac{1}{N} \sum_{n=0}^{N-1-|m|} x(n) * x(n + |m|) \quad (5)$$

$$(|m| = 0, 1, \ldots, N-1)$$

When the above function must be used many times in order to process the data of one frame, the above operation is an obstruction to real-time processing. Therefore, for a processor to perform speech processing, it is preferred that the above operation be buffered in a speech memory and executed independently of a core part. The processor of the present invention makes it possible to realize a means for computing an autocorrelation function independently of a core part by forming a circuit as shown in FIG. 31 with a circuit for exclusively executing multiplication-accumulation shown by equation (5) in the function calculation circuit 390.

In the above description, a frame division/synthesizing operation and autocorrelation operation are taken as examples of operations dedicated to audio signal processing. However, employing a function calculation circuit for any other processing function by employing a configuration similar to the above one for a digital signal processor will provide the same desired advantages of lightening the load of the core part and the length of a program.

Figure 32:
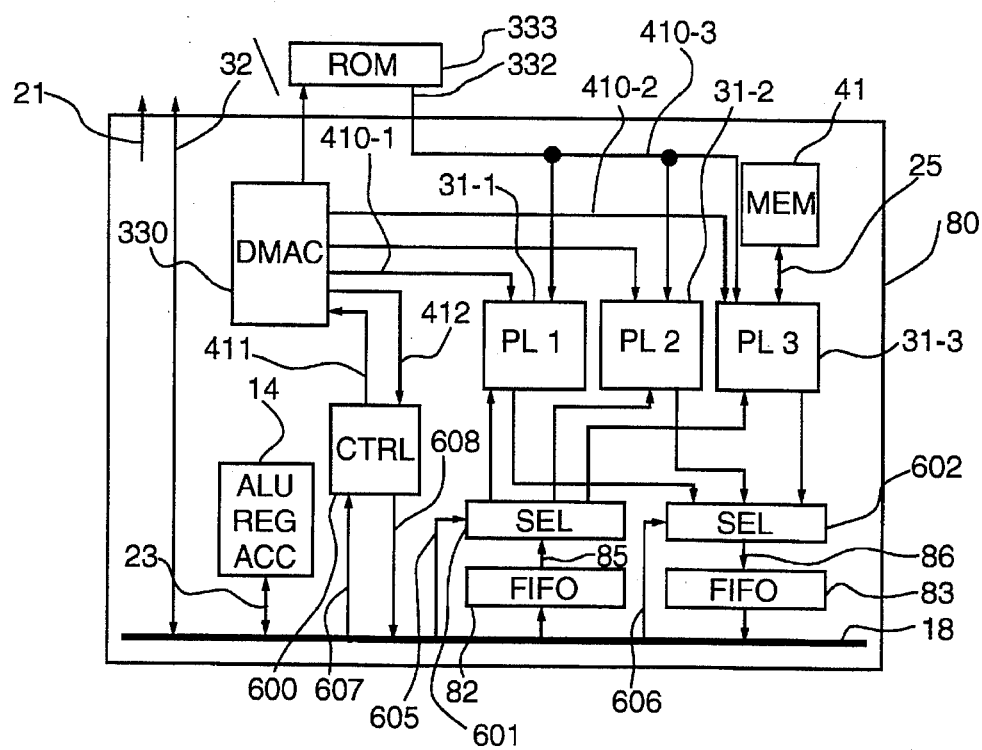
FIG. 32 shows a further modification of the arrangement shown in FIG. 20.

The digital signal processor of the present invention can also be applied to general numerical computation. For example, it is possible to rapidly compute some functions in a function calculation library by using software and a PL part. FIG. 32 shows an example of an arrangement of a digital signal processor that provides suitable hardware for utilizing the above software library (software subroutine: S-SUB), which is based on a further modification of the arrangement shown in FIG. 20, and therefore having constituent parts of like reference number that are not discussed in detail herein.

The configuration in FIG. 32 includes three PL parts. Therefore, it is possible to simultaneously hold three subroutines. Moreover, a core part 14 can efficiently use a hardware subroutine (H-SUB) of the PL part by a circuit configuration control circuit 600 connected to bus 18 through lines 607 and 608, respectively. When the core part 14 uses an H-SUB for the PL part 31, it notifies the circuit configuration control circuit 600 of the identification number of the H-SUB. When circuit configuration data concerning any one of the PL parts has been transferred, the circuit configuration control circuit 600 returns the identification number of the PL to the core part. Unless the circuit configuration data is transferred, the circuit 600 first determines a transfer-destination PL by a predetermined method, and instructs a circuit configuration data transfer control circuit 330 (DMA controller) to transfer the concerned circuit configuration data to the above PL. After transferring the circuit configuration data, the circuit 600 returns the transferred identification number of the PL to the core part. The core part starts the corresponding PL in accordance with the PL identification number to execute operations.

In FIG. 32, arguments and operation results can efficiently be delivered to the H-SUB by the provision of FIFOs 82 and 83 in the input and output parts of the PLs, connected respectively thereto by lines 85 and 86. Moreover, by providing selecting circuits 601 and 602 between the FIFOs and the PLs whose selection is controlled through bus 18 and lines 605 and 606, respectively, it is possible to decrease the number of FIFOs to a single one for input and output respectively in order to downsize the digital signal processor.

Figure 33:
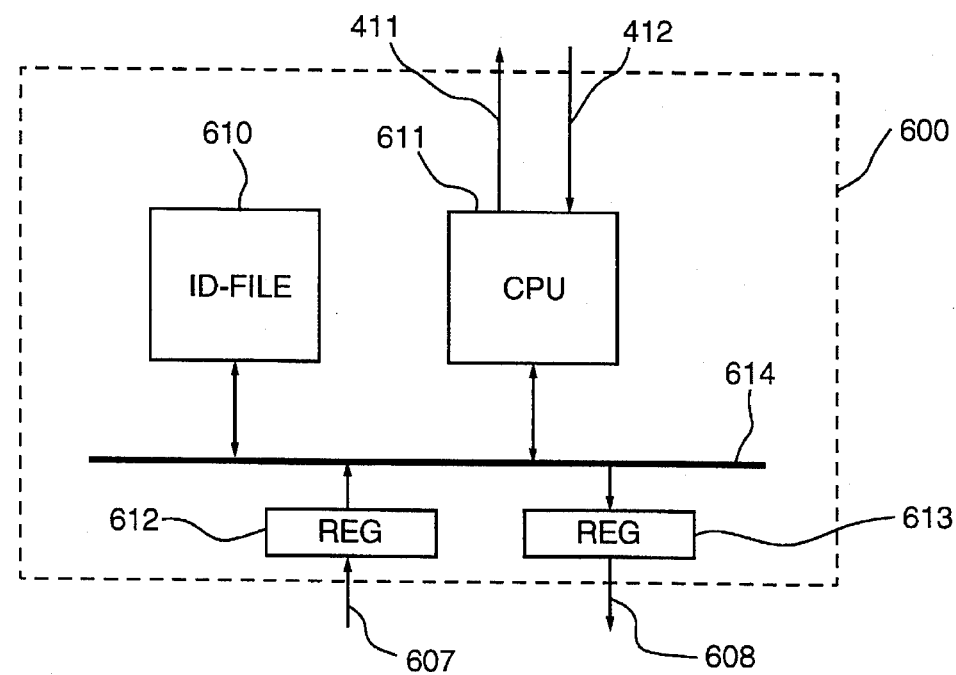
FIG. 33 shows a detailed diagram of the circuit configuration control circuit of FIG. 32.
Figure 34:
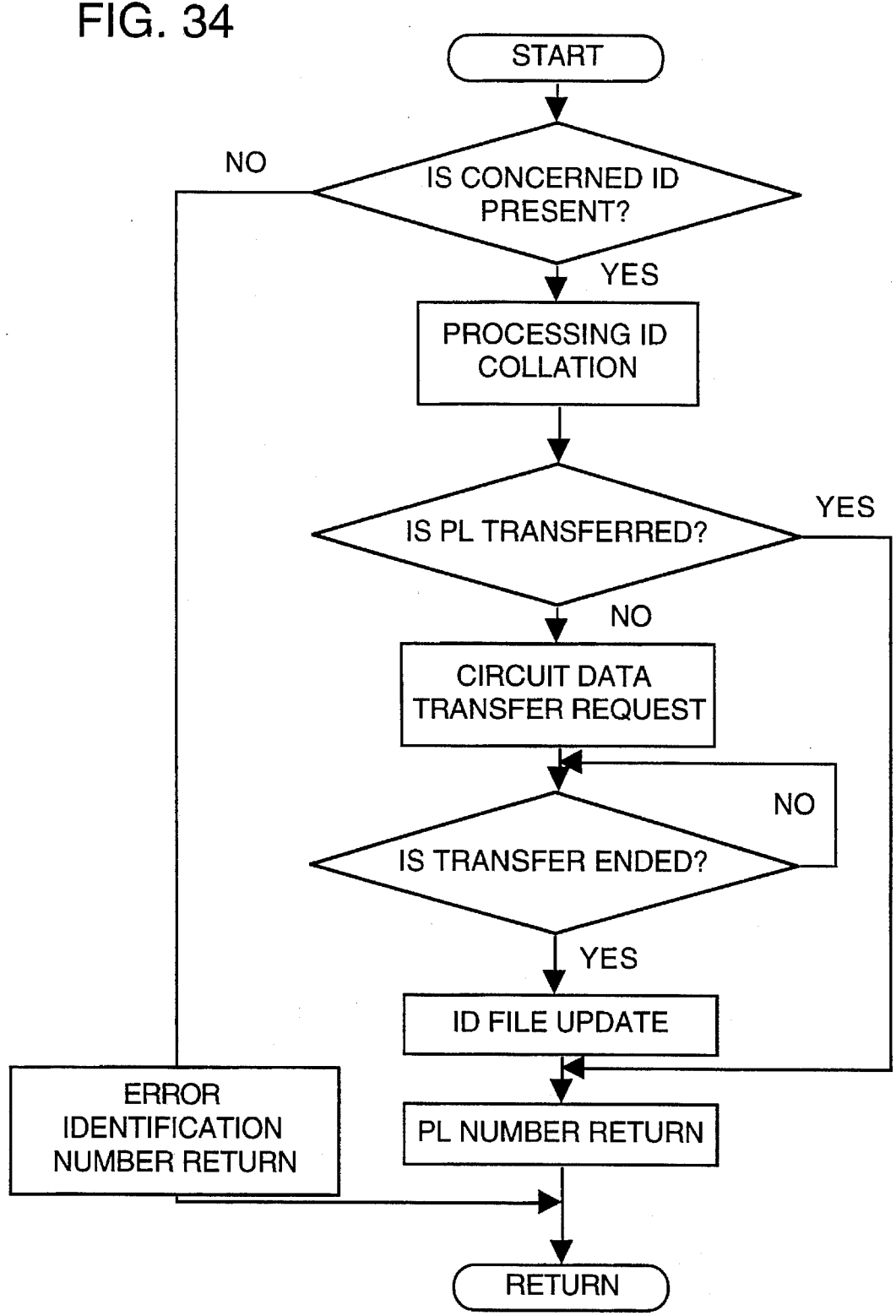
FIG. 34 shows a flow chart of the operation of the CPU of FIG. 33.

FIG. 33 shows an arrangement of the circuit configuration control circuit 600. The circuit configuration control circuit 600 mainly comprises an identification number file 610 showing which H-SUB is transferred to each PL and a CPU 611 for performing control. The identification number of an H-SUB inputted from a core part is stored in a register 612. When the CPU receives data from the core part, it executes the processing shown by the flow chart of FIG. 34.

First, the CPU 611 checks if the inputted H-SUB identification number is present. If so, the CPU 611 collates the number with the identification numbers in the identification number file 610. If not, that is, if an H-SUB corresponding to the ROM 333 for storing circuit configuration data is not present, the CPU 611 judges that an error has occurred and returns an identification number representing the occurrence of an error to the core part. The identification number file 610 comprises registers whose number is equal to the number of PLs, and the N-th register stores the identification number of the H-SUB transferred to the N-th PL. When the digital signal processor starts a processing, simultaneously an identification number representing an untransferred state is stored in the identification number file to indicate a state in which no circuit configuration data is transferred. When the same identification number as the identification number inputted from the core part is stored in the identification number file, the CPU 611 writes the identification number of the PL corresponding to the above number in a register 613 and returns the number to the core part. Unless the above number is found, the CPU 611 specifies a transfer-destination PL and instructs the circuit configuration data transfer control circuit 330 to transfer the concerned circuit configuration data to the specified PL. After the data is transferred, the CPU 611 returns the transferred identification number of the PL to the core part. At the same time, the CPU 611 writes the identification number of the H-SUB in the corresponding register of the identification number file 610.

With respect to specifying a transfer-destination PL, the number of times of the transfer is decreased by selecting a PL storing an H-SUB accessed with the least frequency or a PL accessed at the earliest time. By previously specifying a constantly-used H-SUB from the core part, it is also possible to exclude the PL storing the constantly-used H-SUB from the above candidate PLs. In FIG. 32, an internal memory is also connected to the PL 31-3. The circuit contents of each PL may differ, thus, when a plurality of PLs with different specifications are present, the number of PLs to be used is limited according to the contents of an H-SUB. The CPU 611 has a function of controlling the circuit configuration required by the H-SUB.

The description has been made with reference to FIGS. 22(a) and 22(b), assuming that the circuit configuration control circuit is controlled by the CPU. However, the processings shown in FIG. 34 can be executed by random logic according to the present invention. Moreover, a circuit configuration control circuit can be realized by PLs. When the core part has a high processing performance, it is also possible to execute the processing of the circuit configuration control circuit 600 by the core part.

In FIG. 32, selection signals 605 and 606 of the selection circuits 601 and 602 are handled by the core part. However, it is also possible for the circuit configuration control circuit to output selection signals in accordance with the identification number of a selected PL stored in the register 613. Moreover, by calling the circuit configuration control circuit after the core part stores in advance an argument in the FIFO 82, it is possible for the circuit configuration control circuit to execute processings up to the start of the selected PL. In this case, it is unnecessary to return the PL identification number to the core part.

Figure 35:
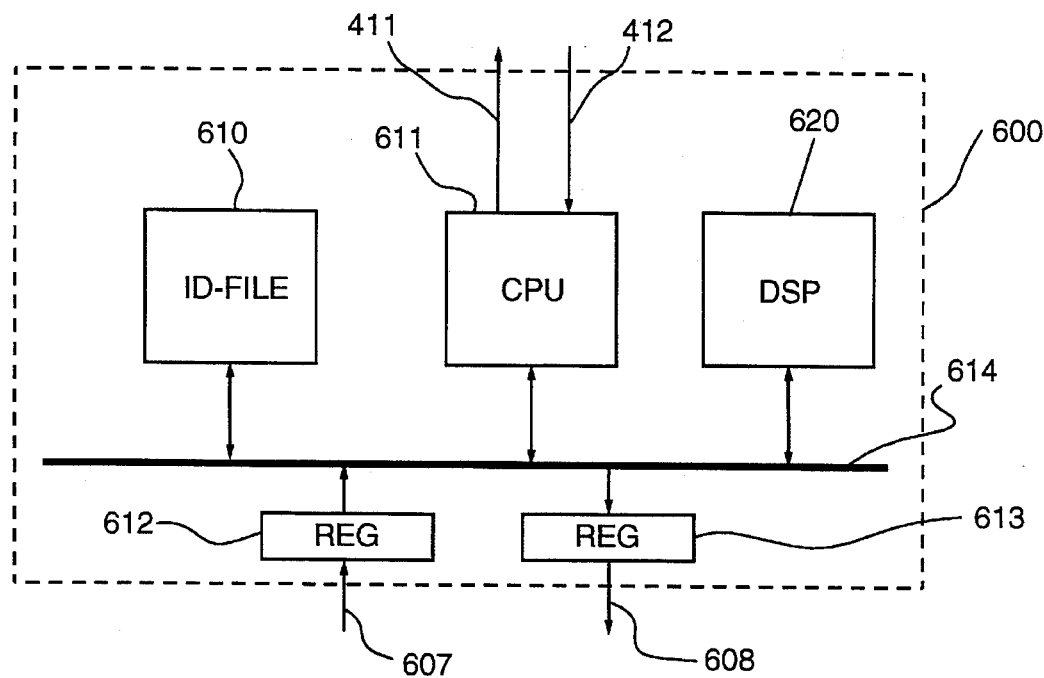
FIG. 35 shows a modification of the circuit configuration control circuit of FIG. 33.

FIG. 35 shows a modification of the circuit of FIG. 33, in which a circuit configuration control circuit 600 is provided with a function of executing an S-SUB. This function could also be provided for core part 14 in some instances. By providing the circuit configuration control circuit 600 with the function of executing the S-SUB, the core part can uniformly use the circuit configuration control circuit regardless of the kind of subroutine, an S-SUB or an H-SUB. That is, the judgment of whether the subroutine is an S-SUB or an H-SUB is made not by the core part, but rather by the circuit configuration control circuit. Unless the specified H-SUB is present in the ROM 333, the circuit configuration control circuit executes an operation by using the software of a DSP 620 and returns the result to the core part. It is also possible to execute the operation with software by using a CPU 614. Such a circuit configuration control circuit having the function of executing an S-SUB is also included in the present invention.

Figure 36:
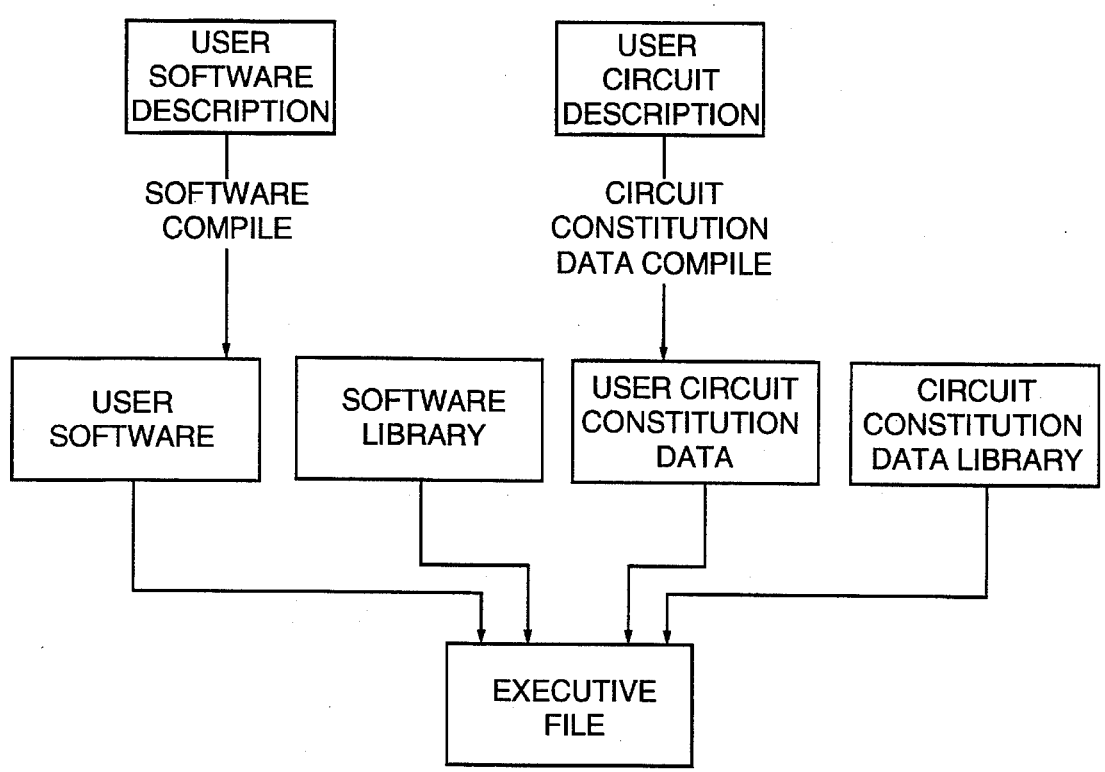
FIG. 36 shows a procedure for developing the program for the digital signal processor of the present invention.

FIG. 36 shows a procedure for developing a program for the digital signal processor shown in FIG. 32. The user writes a program for the core part and the circuit constitution or configuration data for the PL part 31. The software for the core part is written and compiled in an assembly language or in a higher-level language such as FORTRAN, PASCAL, or C to serve as the object code. Circuit configuration data is written and compiled in a language for writing hardware. The user can access an existing software library or circuit configuration data library for the core part or the circuit configuration data description. Object code made by the user, circuit configuration data, and data in a software library and a circuit configuration data library specified by the user are unified in an executive file and stored in a ROM or the like outside the processor.

Figure 37:
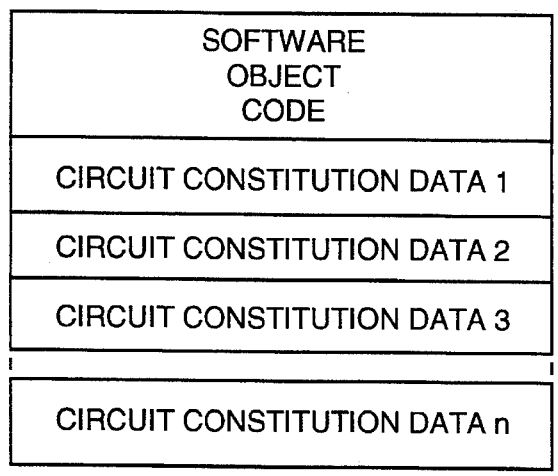
FIG. 37 shows a configuration of the executive file of FIG. 36.

FIG. 37 shows the configuration of an executive file. The executive file can be divided into two files of software object code and circuit configuration data, and moreover the circuit configuration data can be distributed to individual circuits ("n" circuits are used in the case of FIG. 37). The processor executes processings in accordance with the contents of an object code and transfers necessary circuit configuration data to a PL part at the timing specified by the object code.

Figure 38:
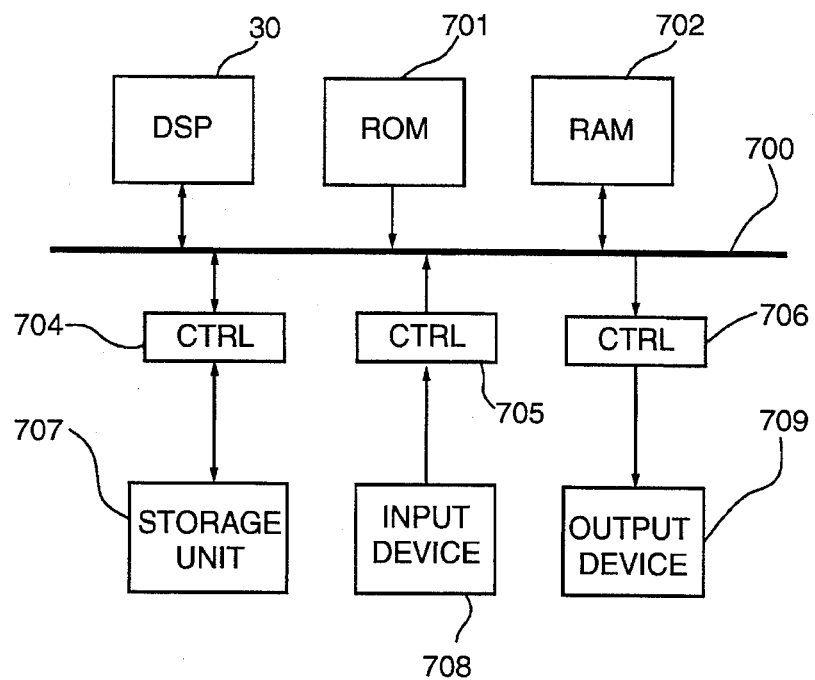
FIG. 38 shows a configuration of the signal processing unit using the digital signal processor of the present invention.

FIG. 38 shows the configuration of a signal processing unit using the processor of the present invention. The processor 30 is a part of the present invention. The signal processing unit comprises a ROM 701 for storing object code and circuit configuration data of the processor, a RAM 702 for storing signal processing data, intermediate results, and control data for executing a program, a memory 707, an interface 704 for control of the memory, an input device 708, an interface for control of the input device, an output device 709, an interface 706 for control of the output device, and a bus 700 for connecting them. A configuration in which some or all of the ROM 701, RAM 702, control interface circuits 704, 705, and 706 are included in the chip of the processor 30, in accordance with the prevent invention.

In all of the above embodiments, a signal processing unit in which the core part 14 and PL part 31 are not present on the same chip is also included in the present invention, however it is preferred that the core part, which is the microprocessor core of the DSP, and PL(s) be part of one LSI.

In all of the above embodiments, a configuration in which a CPU, CPU core, one-chip microcomputer, or one-chip microcomputer core are used instead of the core part 14 is also included in the present invention.

Figure 39:
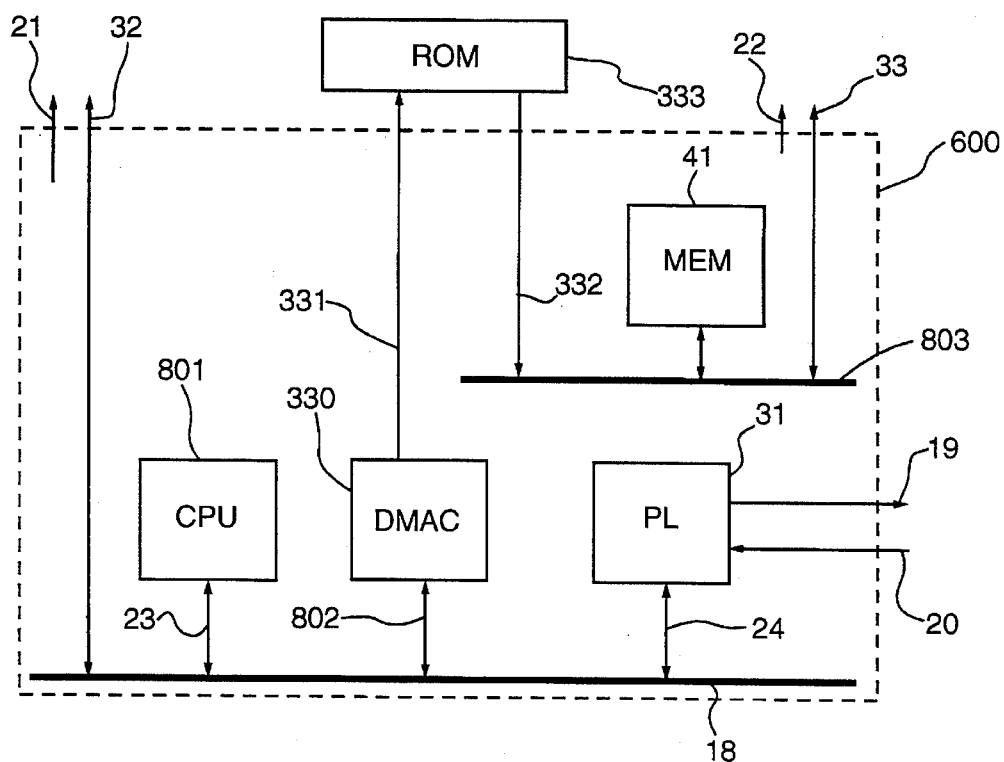
FIG. 39 shows a CPU using the present invention.

FIG. 39 shows a CPU using a CPU 801 instead of the core part 14. Internal buses 18 and 803 are included. The bus 18 is used to transfer control signals between the CPU 801 and circuit configuration data transfer control circuit 330, and transfer data and control signals between the CPU 801 and PL part 31. The bus 803 is used to transfer circuit configuration data from the ROM 333 to the PL 31, transfer data between the PL part 31 and internal memory 41, and transfer data between the outside and PL part through a signal line 33.

Figure 40:
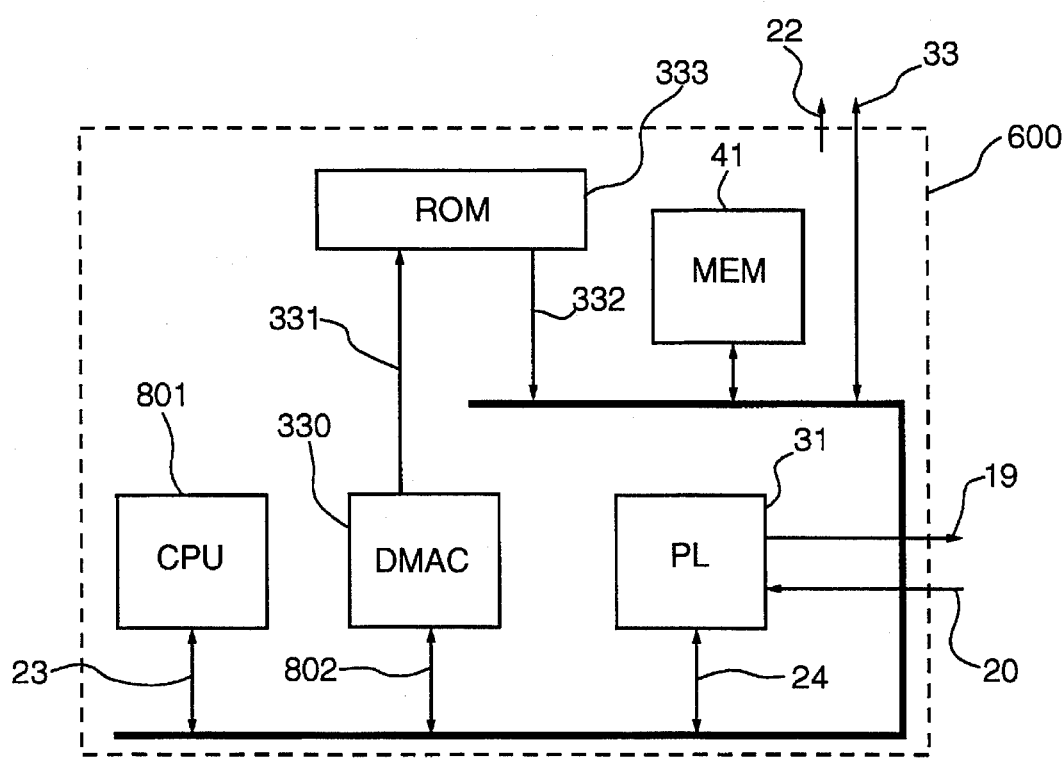
FIG. 40 shows a modification of the CPU of FIG. 39.

FIG. 40 shows a modification of the CPU of FIG. 39. The ROM 333 and memory 41 can be used as an internal ROM or internal memory of a CPU by joining buses 18 and 803. It is also possible to form a configuration in which the buses 18 and 803 can be connected or disconnected by a switch. FIG. 40 shows a configuration in which the ROM 333 is incorporated into a CPU chip. The ROM 333 also serves as a ROM for storing the object code of the CPU. CPU 801 can also be replaced with the core part 14 of FIGS. 39 and 40 according to the present invention.

Because digital video and audio processing is executed at high speed by the programmable logic part, the flexibility of the digital signal processor is not impaired and various types of high-speed signal processings can be executed by the same processor without increasing the circuit size.

We claim:

1. A digital signal processor chip for performing a plurality of signal processings of audio and video input signal data in a data processing system having memory means and providing processed output data, comprising:

said chip being connected to said system;

a first processor part and a second progammable logic part each connected for input and output of data with said system, said second part having programmable logic that is selectively programmed by configuring said programmable logic with circuit configuration data of at least one of a plurality of predetermined logic programs that correspond with a respective one of said signal processings;

an internal processor bus for connecting the first and second parts; and said first part having control means receiving commands from said system for initiating said signal processings and in response for controlling transfer of said circuit configuration data of said plurality of predetermined logic programs from said memory means to the second part so that said circuit configuration data of said predetermined logic programs is successively transferred from said memory means to said second part each time a different one of said plurality of signal processings is commanded to be executed, and said control means controlling inputting of the audio and video input signal data to the second part for executing said respective signal processings following configuring of said programmable logic with said circuit configuration data of said respective logic programs, and further controlling outputting of said output data from said second part to said system.

2. The digital signal processor chip according to claim 1, wherein said programmable logic includes a plurality of arithmetic cells that perform signal processing including receiving said audio and video input signal data through input signal lines and outputting said output data through output signal lines, wherein said input and output lines are connected to buses arranged between the cells and to said processor bus, and wherein said buses are connected together through bus switches having switch connection states for setting the input/output state of each of said arithmetic cells.

3. The digital signal processor chip according to claim 2, wherein said second part has a RAM for storing switch connection data and wherein the switch connection state of said bus switches is controlled through a control line supplying said switch connection data from said RAM to said bus switches.

4. The digital signal processor chip according to claim 2, wherein said arithmetic cells include an arithmetic and logic circuit that performs a data processing function in accordance with said circuit configuration data, said cell receiving data of one input signal of said audio and video input signal data at a time over said input signal lines respectively for processing said one received input signal data with said arithmetic and logic circuit.

5. The digital signal processor chip according to claim 4, wherein each of said arithmetic cells further includes a non-volatile memory for storing configuration data of said data processing function performed by said arithmetic and logic circuit.

6. The digital signal processor chip according to claim 2, wherein said arithmetic cells include an arithmetic and logic circuit and an integrating circuit that perform a data processing function in accordance with said circuit configuration data, said cell receiving data of two input signals of said audio and video input signal data at a time over said input signal lines, respectively, for processing said input data with said arithmeic and logic circuit and said integrating circuit.

7. The digital signal processor chip according to claim 1, further comprising an internal memory connected to said second part for storing interim processed data.

8. The digital signal processor chip according to claim 1, further comprising an internal memory connected to said second part and said first part through said internal processor bus for storing control data transferred between said first and second part.

9. The digital signal processor chip according to claim 1, further comprising at least two separate internal memories connected, through respective selectors controlled by said control means, to said second part and to said first part through said internal processor bus for pipeline processing, including preprocessing said audio and video input signal data with said first part and one of said memories, and post-processing the transferring of said audio and video input signal data to said second part with the other of said memories.

10. The digital signal processor chip according to claim 1, further comprising a plurality of said second progammable logic parts for separately processing said audio and video input signal data in parallel.

11. The digital signal processor chip according to claim 10, wherein said plurality of said second progammable logic parts are logically divided banks of one programmable logic device.

12. The digital signal processor chip according to claim 10, further comprising at least one internal memory connected, through a respective selector controlled by said control means, to said second parts and to said first part through said internal processor bus, wherein said second parts are programmed with a same logic program in parallel using said memory.

13. The digital signal processor chip according to claim 1, further comprising buffers connected between said second part and said system for buffering input and output therebetween and with said internal processor bus.

14. The digital signal processor chip according to claim 13, wherein said buffers are FIFO buffers.

15. The digital signal processor chip according to claim 1, further comprising an internal fixed function signal processing circuit connected to said internal processor bus and said second part for executing a predetermined signal processing function, wherein said control means controls transfer of data to said fixed function signal processing circuit.

16. The digital signal processor chip according to claim 15, further comprising buffers connected between said second part and said system for buffering input and output therebetween and with said internal processor bus.

17. The digital signal processor chip according to claim 1, wherein said programmable logic includes in combination a plurality of arithmetic cells and at least one fixed function signal processing circuit that performs a predetermined signal processing function, said programmable logic receiving said audio and video input signal data through input signal lines and outputting said output data through output signal lines, wherein the input and output lines are connected to buses arranged between the cells and said at least one fixed function signal processing circuit and to said processor bus, and wherein said buses are connected together through bus switches having switch connection states for setting the input/output state of each of said arithmetic cells and said at least one fixed function signal processing circuit.

18. The digital signal processor chip according to claim 1, further comprising a circuit configuration data transfer controller connected to said memory means, said second part and said control means for controlling direct data transfer of said predetermined logic programs to said second part in response to receiving a transfer command from said control means.

19. The digital signal processor chip according to claim 18, wherein said memory means includes at least one of an external and an internal ROM directly connected to said circuit configuration data transfer controller for storing circuit configuration data for said second programmable logic part.

20. The digital signal processor chip according to claim 10, further comprising a circuit configuration data transfer controller connected to said memory means, said second parts and said control means for controlling direct data transfer of said predetermined logic programs to said second parts in response to a request from said control means.

21. The digital signal processor chip according to claim 20, wherein said memory means includes at least one of an external and an internal ROM directly connected to said circuit configuration data transfer controller for storing circuit configuration data for said programmable logic parts.

22. The digital signal processor chip according to claim 1, wherein said memory means includes at least one image frame memory directly connected to said second part, and said second part performs video encoding as said one of said signal processings.

23. The digital signal processor chip according to claim 22, further comprising buffers connected between said internal processor or bus and said second part for buffering input and output with said processor bus.

24. The digital signal processor chip according to claim 23, wherein each of said buffers is a FIFO buffer.

25. A digital signal processor chip for performing a plurality of signal processings of audio and video input signal data in a data processing system having memory means and providing processed output data, comprising:

said chip being connected to said system;

a first processor part and a plurality of second progammable logic parts each connected for input and output of data with said system, each of said programmable logic parts having programmable logic that is selectively programmed by configuring said programmable logic with circuit configuration data of at least one of a plurality of predetermined logic programs that correspond with a respective one of said signal processings;

an internal processor bus for connecting the first and programmable logic parts; and said first part having control means receiving commands from said system for initiating said signal processings and in response for controlling transfer of said circuit configuration data of said plurality of predetermined logic programs from said memory means to the programmable logic parts so that said circuit configuration data of said predetermined logic programs is successively transferred from said memory means to selected ones of said programmable logic parts each time a different one of said plurality of signal processings is commanded to be executed, and said control means controlling inputting of the audio and video input signal data to the respective ones of said programmable logic parts for executing said respective signal processings following configuring of said programmable logic with said circuit configuration data of said respective logic programs, and further controlling outputting of said output data from said programmable logic parts to said system.

26. The digital signal processor chip according to claim 25, wherein each of said programmable logic parts includes a plurality of arithmetic cells that perform signal processing including receiving said audio and video input signal data through input signal lines and outputting said output data through output signal lines, wherein said input and output lines are connected to busès arranged between the cells and to said processor bus, and wherein said buses are connected together through bus switches having switch connection states for setting the input/output state of each of said arithmetic cells.

27. The digital signal processor chip according to claim 25, further comprising a PL bus connecting said programmable logic parts and an internal memory connected to said PL bus and said internal processor bus through selector means for storing interim processed audio and video input signal data.

28. The digital signal processor chip according to claim 25, further comprising a circuit configuration data transfer controller connected to said memory means, said programmable logic part and said control means for controlling direct data transfer of said predetermined logic programs to said programmable logic part in response to a request from said control means.

29. The digital signal processor chip according to claim 28, wherein said memory means includes at least one of an external and an internal ROM directly connected to said circuit configuration data transfer controller for storing circuit configuration data for said programmable logic parts.

30. The digital signal processor chip according to claim 25, wherein said programmable logic parts separately process said audio and video input signal data in parallel.

31. The digital signal processor chip according to claim 25, further comprising at least one of said programmable logic parts separately processing said audio and video input signal data in accordance with one of said signal processings while said circuit configuration data transfer controller controls simultaneously programming of said programmable logic of another of said programmable logic parts with another of said logic programs.

32. The digital signal processor chip according to claim 25, wherein said memory means includes at least one image frame memory directly connected to one of said programmable logic parts which performs an address generating function for generating macro block addresses for image data stored in said frame memories, and wherein another of said programmable logic parts performs one of motion compensation and discrete transform processing of said macro blocks of image data identified by said generated address of said audio and video input signal data.

33. The digital signal processor chip according to claim 25, further comprising at least one of said programmable logic parts processing audio data of said audio and video input signal data for one of speech recognition and speech synthesis.

34. A digital signal processor chip for performing a plurality of signal processings of audio and video input signal data in a data processing system having memory means and providing processed output data, comprising:

said chip being connected to said system;

a first core processor part, at least one second progammable logic part and a circuit configuration controller each connected for input and output of data with said system;

said programmable logic part having programmable logic that is selectively programmed by configuring said programmable logic with circuit configuration data of at least one of a plurality of predetermined logic programs that correspond with a respective one of said signal processings;

a circuit configuration data transfer controller connected to said memory means, said programmable logic part and said circuit configuration controller;

an internal processor bus for connecting the first core part, the circuit configuration controller and said programmable logic part together for data transfer;

said circuit configuration data transfer controller controlling direct transfer of said circuit configuration data of said plurality of predetermined logic programs from said memory means to the programmable logic parts in response to a command from said circuit configuration controller;

said first core part receiving commands from said system for initiating said signal processings and in response instructing said circuit configuration controller to execute direct data transfer commands with said circuit configuration data transfer controller so that said circuit configuration data of said predetermined logic programs is successively transferred from said memory means to said programmable logic part each time a different one of said plurality of signal processings is commanded to be executed; and said first core part having control means for controlling the inputting of the audio and video input signal data to said programmable logic part for executing said respective signal processings following configuring of said programmable logic with said circuit configuration data of said respective logic programs, and further for controlling outputting of said output data from said programmable logic part to said system.

35. The digital signal processor chip according to claim 34, further comprising buffers in combination with selectors connected between said processor bus and said progammable logic part for controlling input and output of said programmable logic part with said processor bus.

36. The digital signal processor chip according to claim 35, wherein each of said buffers are FIFO buffers.

37. The digital signal processor chip according to claim 34, further comprising an internal fixed function signal processing circuit connected to said bus and said first core part for executing a predetermined signal processing function, wherein said control means controls transfer of data to said fixed function signal processing circuit.

38. The digital signal processor chip according to claim 34, further comprising an internal memory connected to said programmable logic part for storing interim processed audio and video input signal data.

39. The digital signal processor chip according to claim 34, wherein said memory means includes at least one of an external and an internal ROM directly connected to said circuit configuration data transfer controller for storing circuit configuration data for said programmable logic part.

40. The digital signal processor chip according to claim 34, further comprising a plurality of said second progammable logic parts for separately processing said audio and video input signal data in parallel.

41. The digital signal processor chip according to claim 34, further comprising said memory means storing a plurality of hardware subroutines that when executed program said programmable logic of a predetermined one of said programmable logic parts with said circuit configuration data of a corresponding one of said logic programs.

42. The digital signal processor chip according to claim 34, wherein said hardware subroutines are called by an identification number, said circuit configuration controller includes a cpu and a file of said identification numbers, and said core part commands said circuit configuration controller to execute said hardware subroutines with said cpu using said identification numbers and, after completion of execution of a hardware subroutine, notifies said first core part of said completion so that said core part subsequently controls transfer of said audio and video input signal data to said corresponding programmable logic part.

43. The digital signal processor chip according to claim 34, further comprising said memory means storing a plurality of software subroutines that are executed by one of said first core part and said circuit configuration controller for performing one of said signal processings of said audio and video input signal data.

44. The digital signal processor chip according to claim 34, wherein said circuit configuration controller includes at least one fixed function signal processing circuit that performs a predetermined signal processing function.

45. A digital signal processor chip for performing a plurality of signal processings of audio and video input signal data in a data processing system having memory means and providing processed output data, comprising:

said chip being connected to said system;

a central processing unit and a second progammable logic part each connected for input and output of data with said system, said second part having programmable logic that is selectively programmed by configuring said programmable logic with circuit configuration data of at least one of a plurality of predetermined logic programs that correspond with a respective one of said signal processings;

a bus for connecting the central processing unit and said second parts; and said central processing unit having receiving commands from said system for initiating said signal processings and in resonse controlling transfer of said circuit configuration data of said plurality of predetermined logic programs from said memory means to the second part so that said circuit configuration data of said predetermined logic programs is successively transferred from said memory means to said second part each time a different one of said plurality of signal processings is commanded to be executed, and said central processing unit controlling inputting of the audio and video input signal data to the second part for executing said respective signal processings following configuring of said programmable logic with said circuit configuration data of said respective logic programs, and further controlling outputting of said output data from said second part to said system.

46. The digital signal processor chip according to claim 45, further comprising a circuit configuration data transfer controller connected to said memory means, said second part and said control means for controlling direct data transfer of said predetermined logic programs to said second part in response to a request from said control means.

47. The digital signal processor chip according to claim 45, further comprising an internal memory connected to said second part for storing interim processed data.

48. The digital signal processor chip according to claim 45, wherein said memory means includes at least one of an external and an internal ROM directly connected to said circuit configuration data transfer controller for storing circuit configuration data for said second part.

\* \* \* \* \*